(12) United States Patent
Kim et al.

(10) Patent No.: US 7,870,583 B2
(45) Date of Patent: Jan. 11, 2011

(54) DIGITAL BROADCAST RECEIVER AND BROADCAST DATA DISPLAY METHOD FOR SIMULTANEOUS DISPLAY OF MULTI-CHANNEL VISUAL IMAGES

(75) Inventors: Hyun Sool Kim, Seoul (KR); Kwang Min Seo, Yongin-si (KR); Sang Hyeon Yoon, Seoul (KR); Ki Tae Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 437 days.

(21) Appl. No.: 11/710,682

(22) Filed: Feb. 23, 2007

(65) Prior Publication Data

US 2007/0277214 A1 Nov. 29, 2007

(30) Foreign Application Priority Data

Feb. 23, 2006 (KR) ........................ 10-2006-0017793
Sep. 15, 2006 (KR) ........................ 10-2006-0089505

(51) Int. Cl.
*G06F 3/00* (2006.01)
*G06F 13/00* (2006.01)
*H04N 7/173* (2006.01)
*H04N 5/50* (2006.01)
*H04N 11/04* (2006.01)

(52) U.S. Cl. .............................. 725/43; 725/50; 725/52; 725/56; 725/139; 348/731; 375/240.25

(58) Field of Classification Search ........................ None
See application file for complete search history.

(56) References Cited

U.S. PATENT DOCUMENTS

| 5,621,456 A * | 4/1997 | Florin et al. ................... 725/43 |
| 5,911,008 A * | 6/1999 | Niikura et al. ................ 382/236 |
| 6,057,893 A * | 5/2000 | Kojima et al. ................ 348/700 |
| 6,075,575 A * | 6/2000 | Schein et al. ................ 725/41 |
| 6,732,371 B1 | 5/2004 | Lee et al. |
| 7,139,006 B2 * | 11/2006 | Wittenburg et al. ......... 345/679 |
| 2003/0229894 A1 * | 12/2003 | Okada et al. .................. 725/41 |
| 2004/0003399 A1 | 1/2004 | Cooper |
| 2004/0128317 A1 * | 7/2004 | Sull et al. ................ 707/104.1 |
| 2004/0150657 A1 | 8/2004 | Wittenburg |
| 2004/0239809 A1 | 12/2004 | Kim et al. |
| 2005/0060667 A1 * | 3/2005 | Robbins ...................... 715/848 |
| 2005/0071782 A1 * | 3/2005 | Barrett et al. ............... 715/838 |
| 2005/0163225 A1 | 7/2005 | Im et al. |

(Continued)

FOREIGN PATENT DOCUMENTS

CN 1551621 12/2004

(Continued)

*Primary Examiner*—Brian T Pendleton
*Assistant Examiner*—Ryan Stronczer
(74) *Attorney, Agent, or Firm*—The Farrell Law Firm, LLP

(57) ABSTRACT

A digital broadcast receiver and broadcast data display method enabling simultaneous display of multi-channel visual images are disclosed. The broadcast data display method includes receiving digital broadcast data on a plurality of channels; simultaneously outputting on a single screen real-time broadcast data of a selected channel and still images of the remaining channels; and periodically updating the still images of the remaining channels. Thereby, up-to-date multi-channel visual images are simultaneously output. Hence, the user can easily perform channel selection and channel switching.

24 Claims, 18 Drawing Sheets

U.S. PATENT DOCUMENTS

| | | | |
|---|---|---|---|
| 2007/0011702 A1* | 1/2007 | Vaysman | 725/45 |
| 2007/0107015 A1* | 5/2007 | Kazama et al. | 725/58 |
| 2008/0022335 A1* | 1/2008 | Yousef | 725/100 |
| 2008/0086746 A1* | 4/2008 | King | 725/43 |
| 2008/0307457 A1* | 12/2008 | Yang et al. | 725/38 |
| 2009/0100462 A1* | 4/2009 | Park et al. | 725/38 |

FOREIGN PATENT DOCUMENTS

| | | |
|---|---|---|
| EP | 1 521 468 | 4/2005 |
| JP | 06-303543 | 10/1994 |
| JP | 09-326972 | 12/1997 |
| JP | 11-205712 | 7/1999 |
| KR | 1019970004192 | 3/1997 |
| KR | 1997-0057307 | 7/1997 |
| KR | 1998-043989 | 9/1998 |
| KR | 1020000003540 | 1/2000 |
| KR | 1020060015075 | 2/2006 |
| WO | WO 99/63753 | 12/1999 |
| WO | WO 2006/076589 | 7/2006 |

* cited by examiner

| CHANNEL IDENTIFIER (81) | I-FRAME (83) |
|---|---|
| MINOR CHANNEL 1 | I-FRAME 1 |
| MINOR CHANNEL 2 | I-FRAME 2 |
| ⋮ | ⋮ |

FIG. 10A

| MINOR CHANNEL 1 | MINOR CHANNEL 2 | MINOR CHANNEL 3 |
|---|---|---|
| MINOR CHANNEL 4 | MAJOR CHANNEL | MINOR CHANNEL 5 |
| MINOR CHANNEL 6 | MINOR CHANNEL 7 | MINOR CHANNEL 8 |

FIG. 10B

| MAJOR CHANNEL | MINOR CHANNEL 1 | MINOR CHANNEL 2 |
|---|---|---|
| | MINOR CHANNEL 3 | MINOR CHANNEL 4 |

DIGITAL BROADCAST RECEIVER AND BROADCAST DATA DISPLAY METHOD FOR SIMULTANEOUS DISPLAY OF MULTI-CHANNEL VISUAL IMAGES

PRIORITY

This application claims priority under 35 U.S.C. §119 to applications filed in the Korean Intellectual Property Office on Feb. 23, 2006, and Sep. 15, 2006, and assigned Serial Nos. 2006-17793, and 2006-89505 respectively, the contents of each of which are incorporated herein by reference.

BACKGROUND OF THE INVENTION

1. Field of the Invention

The present invention relates generally to a digital broadcast receiver and, more particularly, to a digital broadcast receiver and broadcast data display method wherein multi-channel visual images are simultaneously displayed to support easy channel selection and switching.

2. Description of the Related Art

In digital multimedia broadcasting (DMB), various multimedia signals including audios and videos are digitally modulated and delivered to users. Particularly, users in motion can receive various multimedia programs through portable personal or in-vehicle receivers equipped with an omni directional receiving antenna.

Advances in memories capable of storing vast amounts of digital multimedia data such as moving pictures and music videos, and popularization of mobile communication terminals, have enabled recent development and commercialization of mobile communication terminals having DMB reception capabilities, for example DMB phones. While in motion, users can watch or listen to DMB programs through DMB phones.

When a user receiving DMB desires to obtain information on channels other than the current reception channel or desires to switch the current reception channel to a different channel, the user may have to scan all available channels in sequence. In addition, because information on broadcast programs or channels is provided as text-based information including channel names and associated program schedules, the user may have difficulty in intuitively understanding program guide information of a particular channel.

To solve the above problem, an image-based broadcast information providing method has recently been developed. In this image-based method, visual images are pre-assigned to corresponding programs on individual channels or visual images are extracted on demand from video broadcasts on individual channels, to provide program information on a particular channel using the prepared visual images.

However, in such a conventional image-based approach, program information is provided using a fixed image for each program on a channel. Thus, program information that changes with the passage of time cannot be provided. Because up-to-date image information regarding broadcast programs of individual channels cannot be obtained, the user cannot utilize up-to-date image information to select a desired channel.

SUMMARY OF THE INVENTION

The present invention has been made in view of the above problems, and an object of the present invention is to provide a digital broadcast receiver and broadcast data display method that can simultaneously display up-to-date multi-channel visual images and facilitate channel selection of the user.

Another object of the present invention is to provide a digital broadcast receiver and broadcast data display method that can simultaneously display thumbnail images representing digital broadcasts of individual channels in corresponding display areas of a single screen and to facilitate channel selection and switching.

Another object of the present invention is to provide a digital broadcast receiver and broadcast data display method that can simultaneously display real-time broadcast of a major channel and up-to-date informational images of other remaining channels.

Another object of the present invention is to provide a digital broadcast receiver and broadcast data display method wherein a major channel display area for a real-time broadcast and multiple minor channel display areas for up-to-date visual images are simultaneously presented and selection of both the major channel display area and one of the minor channel display areas resulting in major/minor channel switching.

In accordance with the present invention, there is provided a digital broadcast receiver including a broadcast receiving unit, a broadcast output unit and a still image updater. The broadcast receiving unit is for simultaneously receiving digital broadcast data on a plurality of channels; the broadcast output unit is for simultaneously outputting real-time broadcast data of a particular one of the channels and still images of the remaining channels on a single screen; and the still image updater is for periodically updating the still images of the remaining channels.

The digital broadcast receiver may further include a channel setting unit for setting channels to be received by the broadcast receiving unit.

Preferably, the channel setting unit resets the current minor channel on the basis of a channel switch condition set in advance. More preferably, the channel setting unit stores the channel list having a plurality of channel identifiers, selects in sequence one of the channel identifiers in the channel list on the basis of the channel switch condition, and resets the current minor channel to a channel of the selected channel identifier.

The channel list may have a quantity of channel identifiers greater than or equal to the preset quantity of minor channels to be simultaneously displayed. Preferably, the channel identifiers are selected by a user, or are identifiers of favorite channels automatically collected from the channel reception history.

Preferably, the channel switch condition is one of a channel change request input by a user, a preset channel change period, and detection of an I-frame on the current minor channel.

Preferably, the channel setting unit sets, in response to a channel change request from a user, the channels to be received using channel identifiers accompanied by the channel change request.

The still image updater may include an I-frame detector for repeatedly detecting an I-frame in broadcast data of the current minor channel on an I-frame period basis; and an I-frame storage for storing detected I-frames of the minor channels and updating a stored I-frame of the current minor channel with a newly detected I-frame.

Preferably, the I-frame detector pre-stores I-frame periods of the minor channels, and detects an image frame received on the current minor channel at each I-frame period thereof as an I-frame. Alternatively, the I-frame detector compares sizes of received image frames and detects a relatively large image frame as an I-frame.

Preferably, the I-frame storage stores and updates I-frames corresponding to a current minor channel.

The broadcast output unit may include a major channel buffer for storing real-time broadcast data of the major channel; and an image synthesizer for generating a screen output image using the real-time broadcast data stored in the major channel buffer and I-frames stored in the I-frame storage.

Preferably, the image synthesizer sequentially selects from the I-frame storage a quantity of I-frames equal to the preset quantity of minor channels to be simultaneously displayed, and combines the selected I-frames with a video signal of the major channel to generate a screen output image.

The broadcast receiving unit may include a demultiplexer for separating individual digital broadcast signals from digital broadcast data simultaneously received on two or more channels; and a first switch for switching major and minor channel data transmission paths at an output terminal of the demultiplexer.

Preferably, the channel setting unit outputs, on the basis of a major/minor channel switch request from a user or a major/minor channel switch condition set in advance, a control signal to the first switch for switching major and minor channel data transmission paths.

Preferably, the major/minor channel switch condition is a major/minor channel switch period or a major/minor channel switch time.

The broadcast output unit may include a major channel buffer for storing real-time broadcast data of the major channel; a minor channel buffer for storing real-time broadcast data of the minor channels; an image synthesizer for generating a screen output image using the real-time broadcast data stored in the major channel buffer or minor channel buffer and I-frames stored in the I-frame storage; and a second switch for connecting either an output terminal of the major channel buffer or an output terminal of the minor channel buffer to an input terminal of the image synthesizer.

The still image updater may further include a third switch for directing either broadcast data of the major channel or broadcast data of the minor channels to an input terminal of the I-frame detector.

Preferably, the channel setting unit outputs, on the basis of a major/minor channel switch request from a user or a major/minor channel switch condition set in advance, a control signal to the second switch and third switch for switching major and minor channel data transmission paths.

Preferably, the second switch, in response to a control signal from the channel setting unit, connects, if the third switch directs broadcast data of the major channel to the input terminal of the I-frame detector, the output terminal of the minor channel buffer to the input terminal of the image synthesizer, and connects, if the third switch directs broadcast data of the minor channels to the input terminal of the I-frame detector, the output terminal of the major channel buffer to the input terminal of the image synthesizer.

Preferably, the third switch, in response to a control signal from the channel setting unit, directs, if the second switch connects the output terminal of the major channel buffer to the input terminal of the image synthesizer, broadcast data of the minor channels to the input terminal of the I-frame detector, and directs, if the second switch connects the output terminal of the minor channel buffer to the input terminal of the image synthesizer, broadcast data of the major channel to the input terminal of the I-frame detector.

Preferably, the broadcast output unit outputs the real-time broadcast data and still images to corresponding display areas in the single screen.

The digital broadcast receiver may further include an input unit for receiving a user input to select one of the display areas. Preferably, the broadcast output unit performs switching between the major channel and a minor channel associated with the selected display area or enlargement of the selected display area in response to a display area selection by a user through the input unit.

Preferably, the broadcast output unit enlarges the selected display area using pre-stored enlargement information, if a display area associated with the major channel is selected.

Preferably, the broadcast output unit performs switching between the major channel and the minor channel, if a display area associated with a minor channel is selected.

In accordance with another embodiment of the present invention, there is provided a broadcast data display method for a digital broadcast receiver, including receiving digital broadcast data on a plurality of channels; and simultaneously outputting real-time broadcast data of a selected one of the channels and still images of the remaining channels on a single screen.

The simultaneously outputting step may include dividing the single screen into display areas, and outputting the real-time broadcast data and the still images to their corresponding display areas; receiving a user input to select one of the display areas; and performing major/minor channel switching or enlargement of the selected display area, depending upon channel-display area association.

Preferably, the still images of the remaining channels are periodically updated.

Preferably, the real-time broadcast data and the still images are resized according to positions and sizes of their corresponding display areas.

In accordance with another embodiment of the present invention, there is provided a broadcast data display method for a digital broadcast receiver, including displaying a channel list having identifiers of available channels, in response to a broadcast reception request from a user; displaying broadcast data of a channel selected by the user from the channel list on a screen in a full-screen mode; dividing the screen into display areas corresponding to the individual available channels of the channel list, in response to a request of all-channel view during channel list display or broadcast reception; displaying real-time broadcast data of the selected channel in a corresponding display area of the screen; and displaying still images of the remaining channels simultaneously or sequentially in their corresponding display areas.

Preferably, the real-time broadcast data and the still images are resized according to positions and sizes of their corresponding display areas. Preferably, the still images are I-frames detected in broadcast data of the remaining channels other than the selected channel.

The broadcast data display method may further include performing a user-requested function in response to a user input, including dividing the screen into display areas, and outputting the real-time broadcast data and the still images to their corresponding display areas; receiving an input from the user to select one of the display areas; and performing channel switching or enlargement of the selected display area, depending upon channel-display area association.

Preferably, if the selected display area is associated with the selected channel for real-time broadcast data, the selected display area is enlarged using pre-stored enlargement information. Preferably, if the selected display area is associated with one of the remaining channels for still images, switching between the selected channel and the remaining channel associated with the selected display area is performed.

BRIEF DESCRIPTION OF THE DRAWINGS

The above and other objects, features and advantages of the present invention will be more apparent from the following detailed description in conjunction with the accompanying drawings, in which:

FIG. 4 illustrates an I-frame information table for managing information on I-frames of minor channels in the receiver of FIG. 2 or FIG. 3;

FIGS. 10A and 10B illustrate display screen layouts for presenting multi-channel visual images output by the receivers of FIGS. 2, 3, 6 and 7;

DETAILED DESCRIPTION OF PREFERRED EMBODIMENTS

Figure 1:
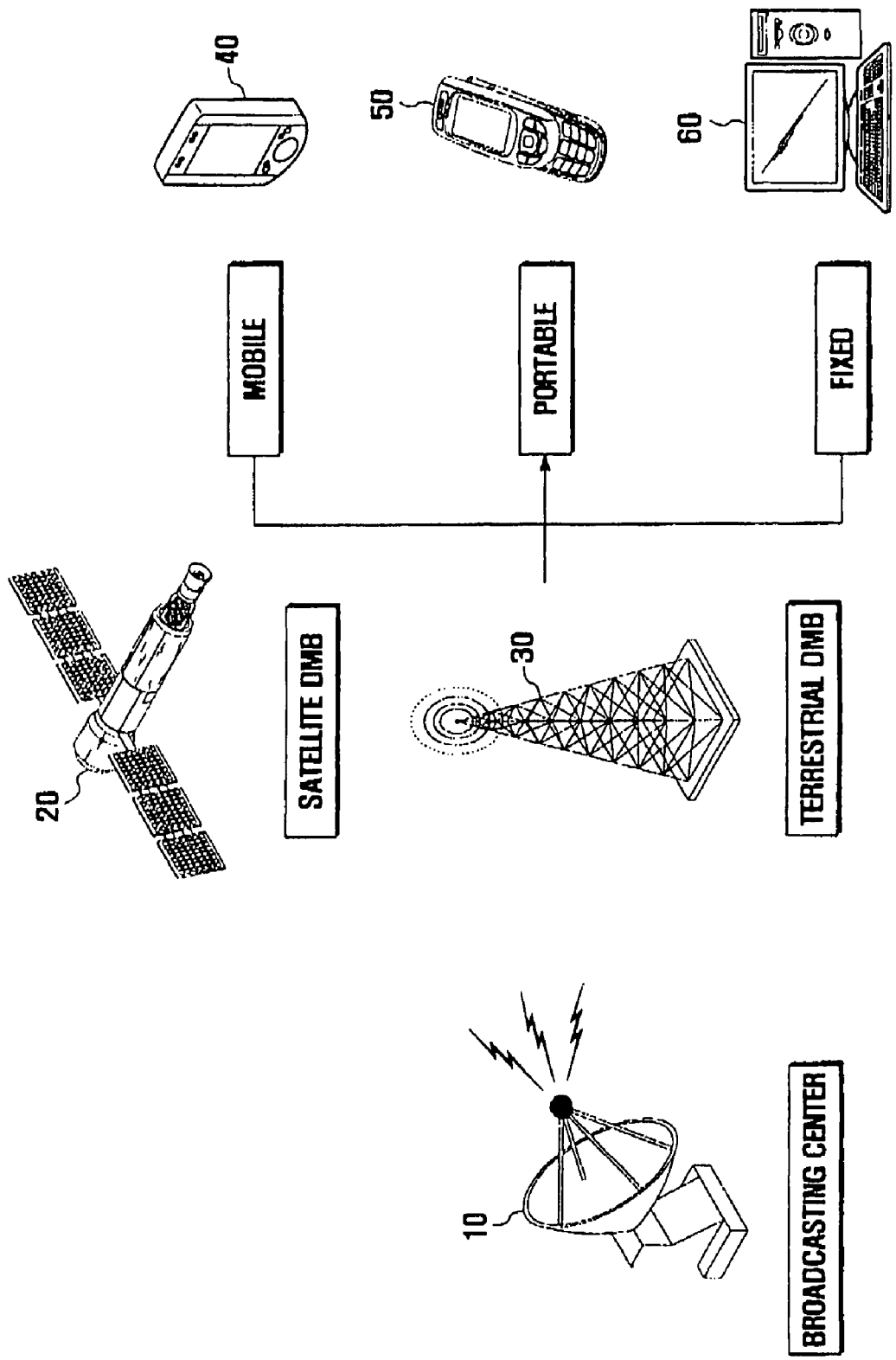
FIG. 1 is an overview of a digital multimedia broadcasting (DMB) system.

Hereinafter, preferred embodiments of the present invention are described in detail with reference to the accompanying drawings. The same reference symbols identify the same or corresponding elements in the drawings. Detailed descriptions of constructions or processes known in the art may be omitted to avoid obscuring the invention in unnecessary detail.

First, a brief introduction to digital multimedia broadcasting (DMB) is provided. Although the present invention is applied to DMB, it may also be applied to any digital broadcasting, such as digital video broadcasting (DVB), and MediaFLO.

DMB services are based on digital audio broadcasting (DAB) technologies for digital radios, and further include multimedia broadcasting concepts to additionally deliver moving images and information services such as weather, news and location services. DMB services can provide compact disc (CD) or digital versatile disc (DVD)-like high quality audio and video broadcast data to users in motion through mobile or in-vehicle receivers, and they are attracting attention as next generation broadcasting services.

That is, DMB services enable users in motion to receive various multimedia broadcast data on multiple channels through mobile or in-vehicle terminals having an omni directional receiving antenna.

Compared with existing broadcasting services, DMB services can be characterized by mobility. DMB systems are divided by signal transmission mechanisms into terrestrial and satellite systems. DMB systems are compared with existing broadcasting systems and comparison results are summarized in Table 1.

TABLE 1

| | Mobility | | |
| --- | --- | --- | --- |
| | Fixed | Mobile | Comparison |
| Transmission mechanism | Existing public broadcasting | Terrestrial DMB | Ground station |
| | Existing satellite broadcasting | Satellite DMB | Artificial satellite |
| Comparison | Middle to large receiver | Very small receiver | |

As shown in Table 1, compared with existing broadcasting services, DMB services can be characterized by mobility and small size of receivers. Broadcasting services are provided though ground stations in terrestrial DMB systems, and are provided through artificial satellites in satellite DMB systems.

In a satellite DMB system as a new broadcast medium, programs are transmitted from a DMB broadcast center to a satellite, which then retransmits the programs to mobile DMB terminals in the wide coverage area of the satellite. Owing to the use of satellite, satellite DMB services are available in outdoor environments across a large area. Gap fillers or repeaters may be required to receive DMB signals and retransmit the received DMB signals in order to provide services to users in shadow areas such as underground or indoor regions.

In a terrestrial DMB system, programs are transmitted through spectrum suitable for terrestrial propagation. Unlike the satellite DMB system, broadcast signals are transmitted through base stations, which are similar to those for mobile terminals, on the ground. A terrestrial DMB service is a multimedia service combining video, audio and data broadcasting that is provided through terrestrial waves to users in motion.

Referring to FIG. 1, the DMB system includes a broadcasting center 10, one or more satellites 20, one or more base stations 30, and a plurality of mobile, portable and fixed receivers such as vehicle receivers 40, mobile terminals 50 and home receivers 60.

The broadcasting center 10 compresses and modulates DMB signals representing audio, video and data signals, and transmits the modulated DMB signals to corresponding satellites 20 or base stations 30.

Each satellite 20 or base station 30 receiving the DMB signals from broadcasting center 10 amplifies the received DMB signals, and retransmits the amplified DMB signals at different frequencies to receivers 40, 50 and 60.

Each receiver 40, 50 or 60 receives the DMB signals from corresponding satellite 20 or base station 30, and demodulates and decompresses the received DMB signals to output uncompressed audio, video and data signals.

Rapidly advancing digital broadcasting technologies have enabled users in fast motion to receive noise-free digital broadcast programs, and have demanded development of new added functions and services for greater user convenience.

A digital broadcast receiver of the present invention maintains one broadcast channel ('major channel') to continuously deliver a digital broadcast, and at least one broadcast channel ('minor channel') to deliver digital broadcasts in an alternating manner according to a preset channel switch condition. The channel switch condition is preferably one of a change request by the user, a preset change period, and detection of I-frames on minor channels, and is described later.

Figure 2:
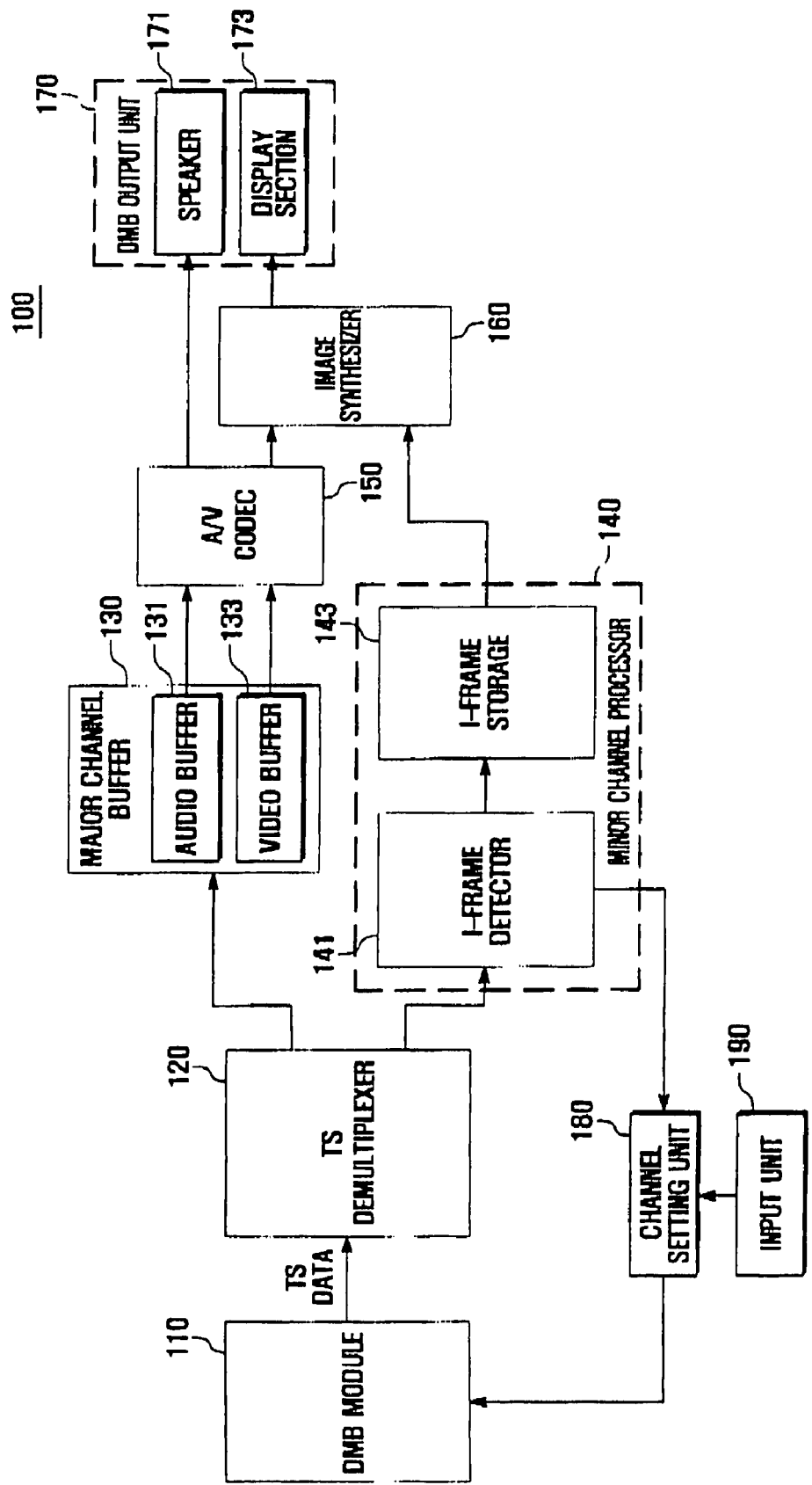
FIG. 2 is a block diagram of a DMB receiver according to the present invention.

Referring to FIG. 2, DMB receiver 100 includes a DMB module 110, a TS demultiplexer 120, a major channel buffer 130, a minor channel processor 140, an A/V codec 150, an image synthesizer 160, a DMB output unit 170, a channel setting unit 180, and an input unit 190.

DMB module 110 receives a multi-channel broadcast signal corresponding to broadcast channels selected by the user, and outputs transport stream (TS) data of the selected broadcast channels. In satellite DMB, DMB module 110 sets Walsh codes (a Walsh code is a code used to extract TS packets of a particular channel from broadcast data transmitted over an MPEG-2 transport stream) associated with a major channel and a minor channel on the basis of reception channel information from channel setting unit 180, extracts TS data of the major and minor channels using the Walsh codes, and outputs the extracted TS data. Before output of the extracted TS data, DMB module 110 deinterleaves the extracted TS data using associated channel information.

TS demultiplexer 120 demultiplexes the TS data from DMB module 110 into major channel data and minor channel data, detects MPEG-4 format data from the major channel data and minor channel data, and outputs the major channel MPEG-4 data and minor channel MPEG-4 data to the major channel buffer 130 and minor channel processor 140 respectively.

Major channel buffer 130 stores broadcast data of the major channel from TS demultiplexer 120. To separately store the audio portion and visual portion of the broadcast data, major channel buffer 130 preferably includes an audio buffer 131 for storing audio data in a digital form and video buffer 133 for storing video data in a digital form.

Minor channel processor 140 detects video data from the minor channel broadcast data from TS demultiplexer 120, detects an I-frame from the detected video data, and stores the detected I-frame. Minor channel processor 140 preferably includes an I-frame detector 141 for detecting I-frames, and an I-frame storage 143 for storing detected I-frames and associated minor channel identifiers.

An MPEG-compressed video data stream includes intra-coded frames or I-frames, predictive frames or P-frames, and bidirectional frames or B-frames. I-frames are reference frames for MPEG compression and decompression, and are repeated in an MPEG-compressed video data stream by a preset period of time (0.5 seconds for the satellite DMB system). In addition, the size of an I-frame is greater than that of a P-frame or B-frame. For example, the P-frame size is about $\frac{1}{10}$ of the I-frame size.

I-frame detector 141 detects an I-frame at each I-frame period in the minor channel broadcast data from TS demultiplexer 120. The minor channel broadcast data fed to minor channel processor 140 can include both video data and audio data. Hence, I-frame detector 141 preferably detects video data in the minor channel broadcast data then detects an I-frame from the detected video data.

Preferably, I-frame detector 141 pre-stores I-frame periods to detect an image frame received at each I-frame period as an I-frame, or compares sizes of received image frames to detect a relatively large image frame as an I-frame.

I-frame storage 143 stores I-frames detected by I-frame detector 141 and associated minor channel identifiers. The stored I-frame of a current minor channel is updated at each I-frame period.

This is because image synthesizer 160 uses stored I-frames of minor channels (in particular, the previous minor channel) to display on a single screen I-frame images of the minor channels, which alternate with one another at a predetermined channel switch period. I-frame storage 143 preferably stores a quantity of I-frames greater than or equal to the quantity of preset minor channels to be received simultaneously with the major channel. I-frames arranged in a tabular format are illustrated in FIG. 4. Referring to FIG. 4, an I-frame information table 80 includes channel identifier fields 81 and I-frame fields 83 to store I-frames according to their corresponding channels.

A/V codec 150 decodes digital audio data and video data from major channel buffer 130, and outputs decoded data as an audio signal and video signal.

Image synthesizer 160 combines major channel video data decoded by A/V codec 150 with multiple minor channel images from minor channel processor 140. That is, the major channel video data is combined with I-frames of minor channels stored in I-frame storage 143. Preferably, image synthesizer 160 stores the preset quantity of minor channels, and selects in sequence from I-frame storage 143 a quantity of I-frames for image synthesis equal to the preset quantity of minor channels.

DMB output unit 170 includes a speaker 171 for outputting an audio signal from A/V codec 150, and a display section 173 for displaying a video signal from image synthesizer 160. Display section 173 preferably simultaneously displays major channel video data and minor channel video data on a single screen using the output signal from image synthesizer 160.

Channel setting unit 180 sets identifiers of major and minor channels to be received according to user selections through input unit 190, and transmits the channel identifiers to DMB module 110. Preferably, channel setting unit 180 pre-stores a channel ID list having a plurality of identifiers of minor channels selected by the user or a plurality of favorite channel identifiers automatically collected from channel reception histories, selects a channel identifier from the channel ID list in sequence according to a channel switch condition set in advance, and transmits the selected channel identifier to DMB module 110. The channel ID list preferably includes a quantity of channel identifiers greater than or equal to the preset quantity of minor channels to be simultaneously output to a single screen.

The channel switch condition may be a change request by the user, a preset change period, or detection of an I-frame on the current minor channel. If the channel switch condition is a change request by the user, channel setting unit 180 preferably sets the current minor channel to a channel of a channel identifier accompanied by the change request.

If the channel switch condition is a change request by the user or a preset change period, channel setting unit 180 maintains the current minor channel until the channel switch condition is satisfied, and minor channel processor 140 updates the I-frame of the current minor channel stored in I-frame storage 143 at each I-frame period.

Accordingly, DMB output unit 170 both outputs broadcast data of the major channel fed via major channel buffer 130 and displays a preset quantity of minor channel images using minor channel I-frames stored in I-frame storage 143, wherein the image of the current minor channel is updated and newly displayed at each I-frame period until the current minor channel is switched to another channel.

For a minor channel switch through I-frame detection, I-frame detector 141 preferably informs channel setting unit 180 of detection of an I-frame of a particular minor channel. Because an I-frame contains a reference image for MPEG compression and decompression, it is possible to create a visual image of the particular minor channel. That is, if an I-frame of the current minor channel is detected, a visual image of the current minor channel is updated with the detected I-frame image, and the current minor channel is switched to a next minor channel for video data reception.

Accordingly, in the present invention, while broadcast data of a major channel is being output, newly updated visual images of multiple minor channels can be delivered.

Instead of using such a channel ID list for a minor channel switch, channel setting unit 180 may directly set or modify minor channel identifiers according to information supplied by each user selection, and transmit the minor channel identifiers to DMB module 110.

When a major channel change request is input through input unit 190, channel setting unit 180 changes the major channel identifier according to information accompanied by the change request. That is, channel setting unit 180 sets identifiers of major and minor channels to be received by DMB module 110, and controls DMB module 110 to alternate multiple minor channels while the major channel is fixed.

Figure 3:
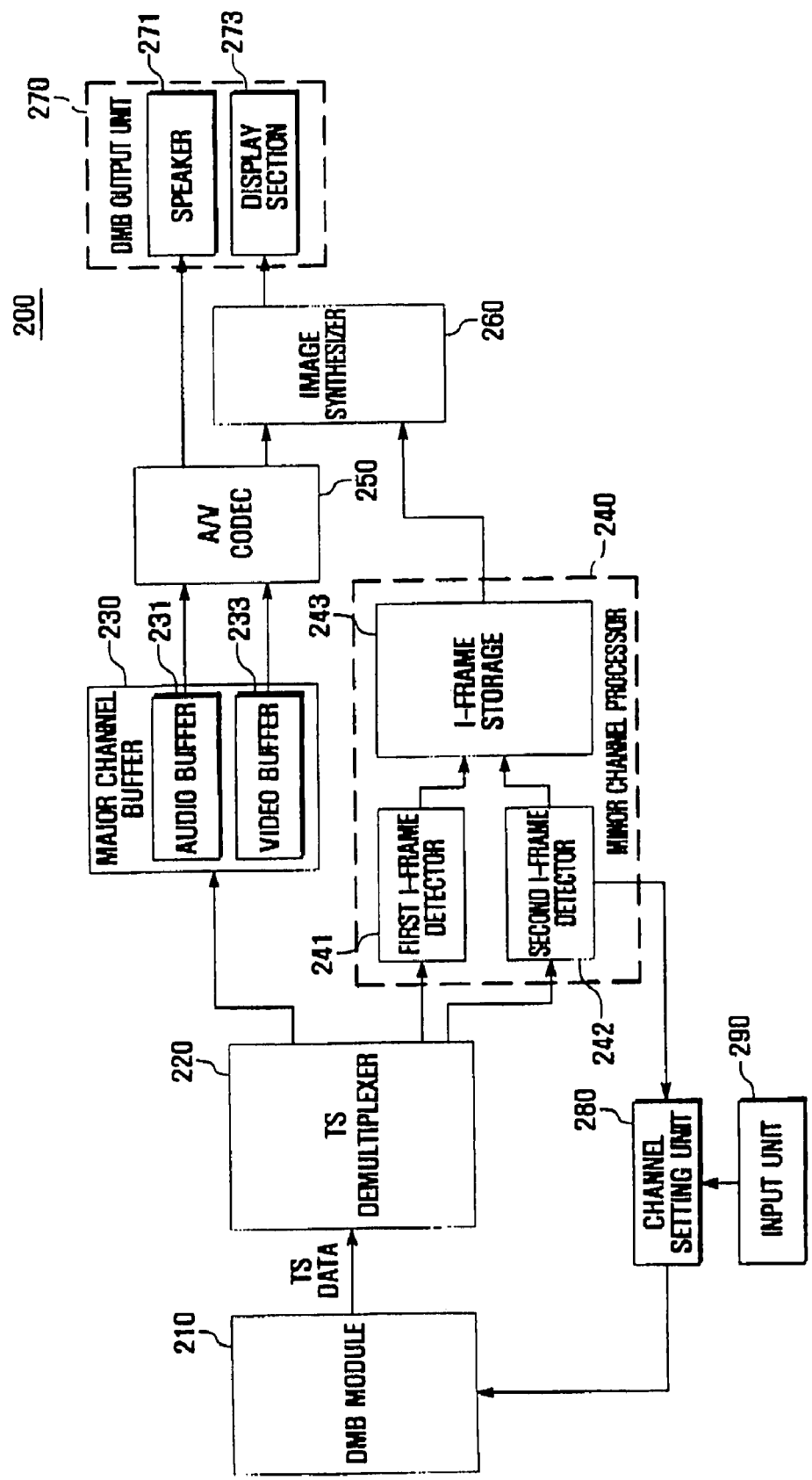
FIG. 3 is a block diagram of a DMB receiver according to another embodiment of the present invention.

Referring to FIG. 3, DMB receiver 200 includes a DMB module 210, a TS demultiplexer 220, a major channel buffer 230, a minor channel processor 240, an A/V codec 250, an image synthesizer 260, a DMB output unit 270, a channel setting unit 280, and an input unit 290. Compared with DMB receiver 100 of FIG. 2, DMB receiver 200 can simultaneously receive broadcast data of two minor channels if available channels exist.

Elements of DMB receiver 200 are similar in function to corresponding elements of DMB receiver 100 of FIG. 2. That is, DMB module 210, TS demultiplexer 220, major channel buffer 230, minor channel processor 240, A/V codec 250, image synthesizer 260, DMB output unit 270, channel setting unit 280, and input unit 290 of DMB receiver 200 shown in FIG. 3 are similar in function, respectively, to DMB module 110, TS demultiplexer 120, major channel buffer 130, minor channel processor 140, A/V codec 150, image synthesizer 160, DMB output unit 170, channel setting unit 180, and input unit 190 of the DMB receiver 100 shown in FIG. 2.

However, with an increased number of minor channels to be received, operations of the elements in FIG. 3 related to minor channel processing are different from those of corresponding elements in FIG. 2.

Channel setting unit 280 sets one major channel identifier and two minor channel identifiers, and transmits the three channel identifiers to DMB module 210. In satellite DMB, DMB module 210 sets three Walsh codes on the basis of the major and minor channel identifiers, and extracts TS data corresponding to one major channel and two minor channels using the Walsh codes and outputs the extracted TS data. TS demultiplexer 220 separates major channel data, first minor channel data and second minor channel data from the TS data output from DMB module 210, detects MPEG-4 data from the separated data, and outputs the detected MPEG-4 data.

To simultaneously process video broadcasts on multiple minor channels, minor channel processor 240 includes an I-frame detector for each minor channel. Minor channel processor 240 includes a first I-frame detector 241 for detecting an I-frame of a first minor channel, a second I-frame detector 242 for detecting an I-frame of a second minor channel, and an I-frame storage 243 for storing I-frames output from the first and second I-frame detectors 241 and 242.

As described above, with an increased number of minor channels, operations of DMB module 210, TS demultiplexer 220, minor channel processor 240 and channel setting unit 280 in FIG. 3 are different from those of corresponding elements in FIG. 2. Elements in FIG. 3 other than those listed above are similar in operation to corresponding elements in FIG. 2, and a repeated description thereof is omitted.

FIG. 2 is a block diagram of a DMB receiver having one minor channel simultaneously received with a major channel, and FIG. 3 is a block diagram of a DMB receiver having two minor channels. However, the present invention is not limited to a DMB receiver having one minor channel or two minor channels. The present invention relates to a DMB receiver that can simultaneously display visual images of a major channel and multiple minor channels, wherein each minor channel is selected in sequence according to a channel switch condition described above and the displayed image of the selected minor channel is continuously updated with a newly received image. The present invention is not limited by the quantity of minor channels simultaneously receivable with a major channel, and the quantity of minor channels can increase along with performance improvement of the DMB module.

Figure 5:
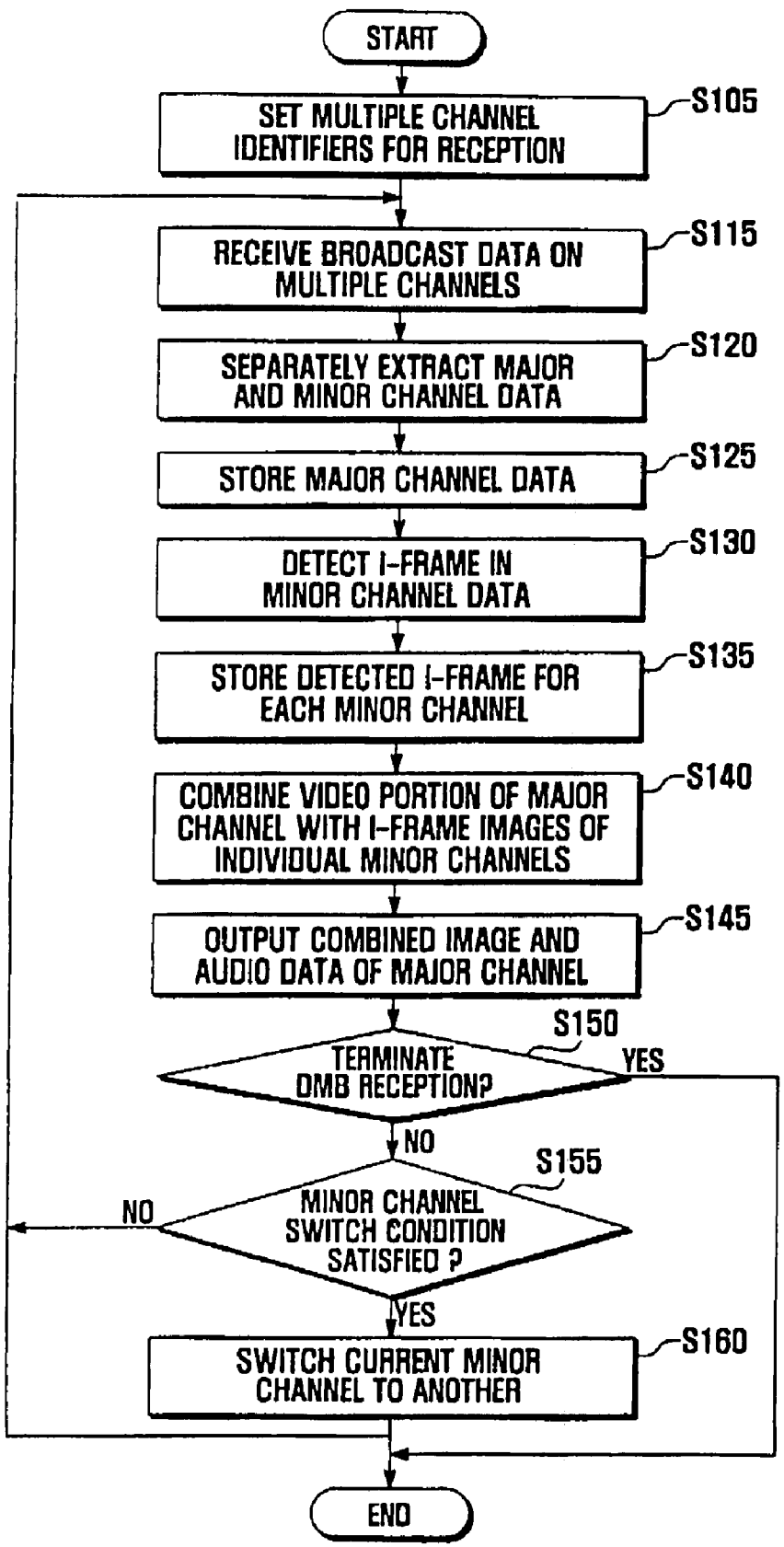
FIG. 5 is a flow chart of a method of simultaneously displaying multi-channel visual images for the receiver of FIG. 2 or FIG. 3.

Referring to FIG. 5, the method is described as follows.

The DMB receiver sets multiple channel identifiers for DMB reception in step S105. At this step, the DMB receiver sets a major channel identifier and a quantity of minor channel identifiers. Preferably, the DMB receiver pre-stores a channel ID list having a plurality of identifiers of minor channels selected by the user or a plurality of favorite channel identifiers automatically collected from channel reception histories, and selects a channel identifier from the channel ID list in sequence according to a preset channel switch condition to set the current minor channel to a channel of the selected channel identifier. The channel switch condition is described above in relation to FIG. 2.

When DMB reception is initiated in step S115, the DMB receiver receives broadcast data on multiple channels of the channel identifiers set at step S105, and separately extracts major channel data and minor channel data from the received broadcast data in step S120 because the major channel data and minor channel data in the broadcast data received at step S115 are in an interleaved form. This separate extraction operation is similar to the operation of TS demultiplexer 120 described in relation to FIG. 2.

After separate extraction of the major channel data and minor channel data at step S120, the DMB receiver stores the major channel data at step S125. An I-frame of the current minor channel is detected from the minor channel data at step S130, and the detected I-frame is stored according to its corresponding channel in step S135. Steps S130 and S135 for minor channel processing are similar to the operation of minor channel processor 140 described in relation to FIG. 2.

After storing the major channel data and I-frame detection, the DMB receiver combines the video portion of the major channel with a quantity of I-frame images equal to the preset quantity of the minor channels in step S140, and outputs the combined major/minor channel visual image with the audio data of the major channel in step S145.

While in DMB reception, namely, if reception of the fixed major channel is not terminated in step S150, if the channel switch condition is satisfied in step S155, the DMB receiver switches the current minor channel to another minor channel in step S160, and repeats steps S115 through S155 for continued DMB reception.

The condition to switch channels is preferably one of a change request by the user, a preset change period and detection of an I-frame on the current minor channel. The condition to switch channels at step S160 to switch between minor channels are described in relation to channel setting unit 180 in FIG. 2.

Through steps described above, the DMB receiver of FIG. 2 or 3 simultaneously displays up-to-date multi-channel visual images. In particular, up-to-date visual images of multiple minor channels are displayed during reception of a major channel, thereby facilitating channel selections of the user.

Figure 6:
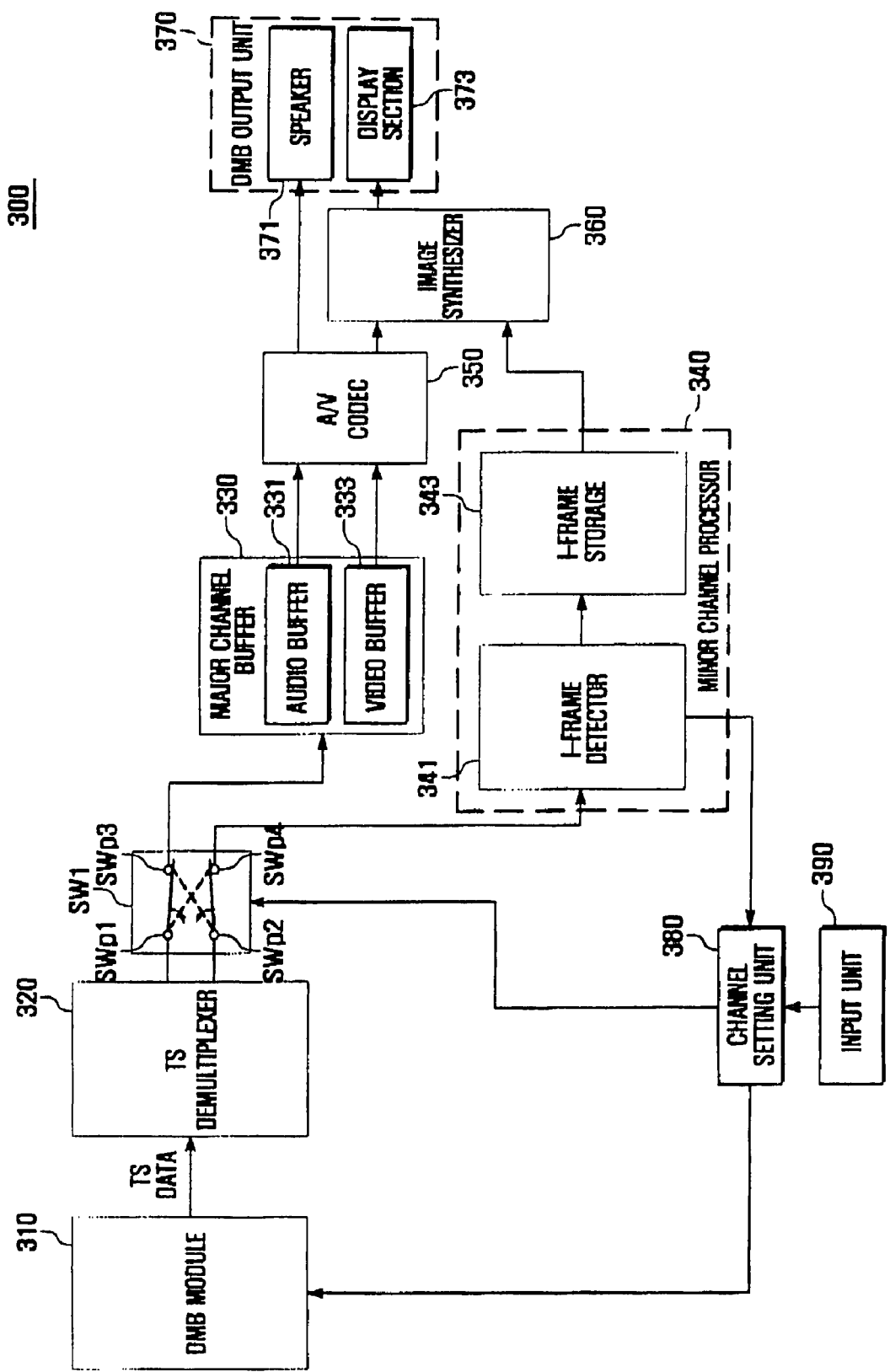
FIG. 6 is a block diagram of a DMB receiver according to another embodiment of the present invention.

FIG. 6 illustrates a configuration of a DMB receiver according to another embodiment of the present invention.

Referring to FIG. 6, DMB receiver 300 includes a DMB module 310, a TS demultiplexer 320, a major channel buffer 330, a minor channel processor 340, an A/V codec 350, an image synthesizer 360, a DMB output unit 370, a channel setting unit 380, an input unit 390, and a first switch SW1. Compared with DMB receiver 100 of FIG. 2, DMB receiver 300 performs switching between major and minor channels in response to a major/minor channel switch request, and further includes the first switch SW1 to perform switching between major and minor channel data transmission paths.

Elements of DMB receiver 300 are similar in function to corresponding elements of DMB receiver 100 of FIG. 2. That is, DMB module 310, TS demultiplexer 320, major channel buffer 330, minor channel processor 340, A/V codec 350, image synthesizer 360, DMB output unit 370, channel setting unit 380, and input unit 390 of the DMB receiver 300 shown in FIG. 6 are similar in function, respectively, to DMB module 110, TS demultiplexer 120, major channel buffer 130, minor channel processor 140, A/V codec 150, image synthesizer 160, DMB output unit 170, channel setting unit 180, and input unit 190 of DMB receiver 100 shown in FIG. 2.

Elements in FIG. 6 other than channel setting unit 380 are similar in operation to corresponding elements in FIG. 2, and a repeated description thereof is omitted. In the case of channel setting unit 380, it transmits a control signal for switching between major and minor channel data transmission paths to the first switch SW1.

Channel setting unit 380 outputs a control signal to the first switch SW1 for switching data transmission paths on the basis of a user selection through input unit 390 or a major/minor channel switch condition set in advance. The major/minor channel switch condition is preferably a major/minor channel switch period or a major/minor channel switch time. If the condition to switch the major/minor channel is a major/minor channel switch period, channel setting unit 380 repeatedly outputs a control signal at regular intervals for switching between major and minor channels. If the condition to switch the major/minor channel is a major/minor channel switch time, channel setting unit 380 outputs a control signal at a specified time for switching between major and minor channels.

In response to a control signal from channel setting unit 380, the first switch SW1 changes current transmission paths. For example, before reception of a control signal by the first switch SW1, it is assumed that a first contact point SWp1 and third contact point SWp3 are interconnected to form a major channel data transmission path and a second contact point SWp2 and fourth contact point SWp4 are interconnected to form a minor channel data transmission path. After reception of the control signal, the first switch SW1 forms a major channel data transmission path by interconnecting the first contact point SWp1 and fourth contact point SWp4, and also forms a minor channel data transmission path by interconnecting the second contact point SWp2 and third contact point SWp3.

As a result, before reception of the control signal, broadcast data passed through the first contact point SWp1 and third contact point SWp3 was processed as major channel data, and, after reception of the control signal, the broadcast data is directed to pass through the first contact point SWp1 and fourth contact point SWp4 and is processed as minor channel data; while broadcast data passed through the second contact point SWp2 and fourth contact point SWp4 was processed as minor channel data before reception of the control signal, and after reception of the control signal the broadcast data is directed to pass through the second contact point SWp2 and third contact point SWp3 and is processed as major channel data.

Accordingly, DMB receiver 300 of FIG. 6 can perform switching between major and minor channel data transmission paths in response to a control signal from channel setting unit 380.

Figure 7:
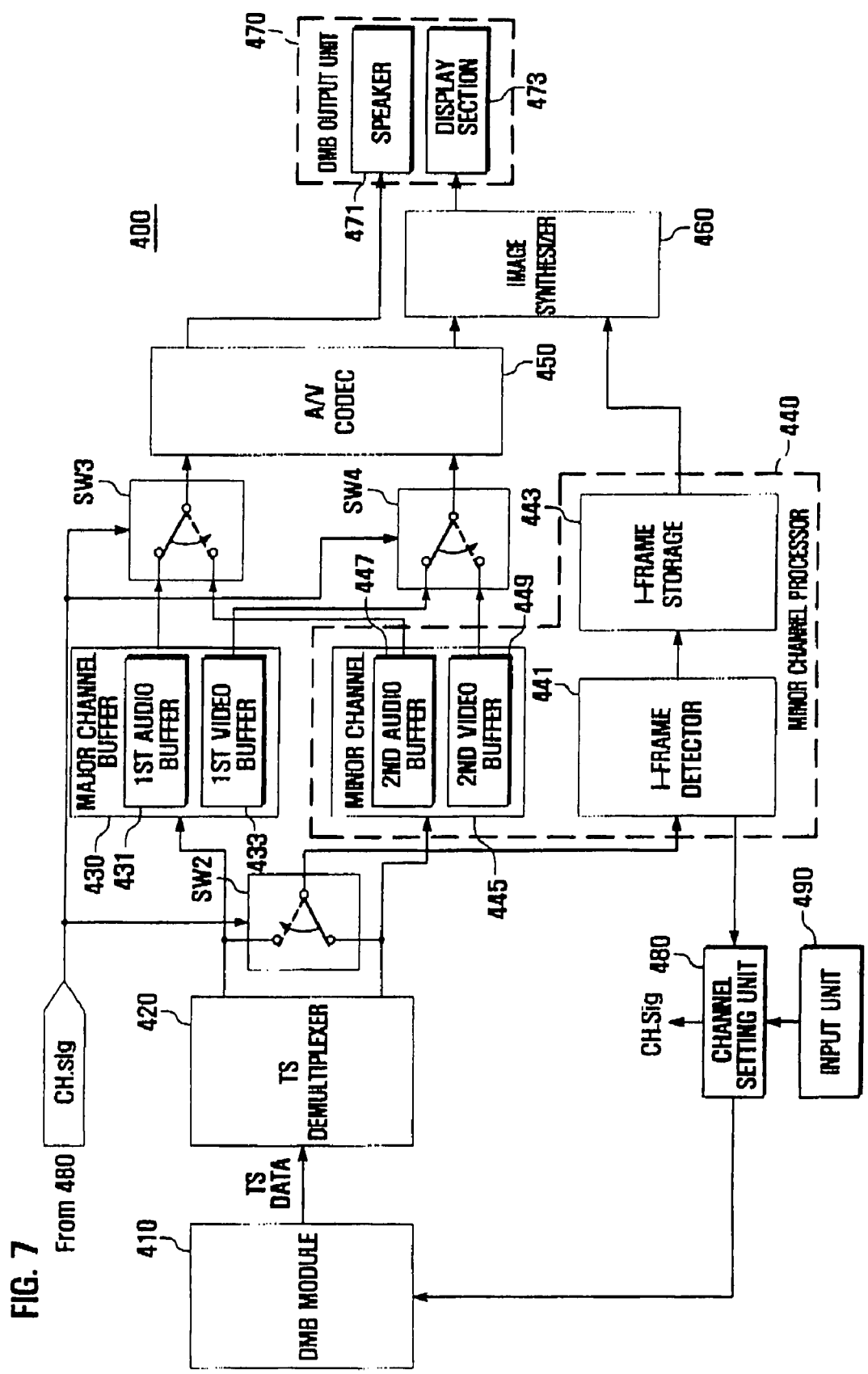
FIG. 7 is a block diagram of a DMB receiver according to another embodiment of the present invention.

Referring to FIG. 7, DMB receiver 400 includes a DMB module 410, a TS demultiplexer 420, a major channel buffer 430, a minor channel processor 440, an A/V codec 450, an image synthesizer 460, a DMB output unit 470, a channel setting unit 480, an input unit 490, a second switch SW2, a third switch SW3, and a fourth switch SW4. Compared with DMB receiver 100 of FIG. 2, DMB receiver 400 performs switching between major and minor channels in response to a major/minor channel switch request, and stores minor channel data to minimize a major/minor channel switch time, and further includes a minor channel buffer 445 within minor channel processor 440 and the second to fourth switches SW2 to SW4 for changing transmission paths.

Elements in FIG. 7 other than those related to a change of transmission paths and storage of minor channel data (the minor channel processor 440, channel setting unit 480 and second to fourth switches SW2 to SW4) are similar in function to corresponding elements in FIG. 2. That is, DMB module 410, TS demultiplexer 420, major channel buffer 430, A/V codec 450, image synthesizer 460, DMB output unit 470, channel setting unit 480, and input unit 490 of the DMB receiver 400 shown in FIG. 7 are similar in function as DMB module 110, TS demultiplexer 120, major channel buffer 130, A/V codec 150, image synthesizer 160, DMB output unit 170, channel setting unit 180, and input unit 190 of DMB receiver 100 shown in FIG. 2.

Compared with channel setting unit 180 in FIG. 2, channel setting unit 480 additionally outputs a control signal to the second to fourth switches SW2 to SW4 to change major and minor channel data transmission paths.

Channel setting unit 480 outputs a control signal CH.sig to the second, third and fourth switches SW2, SW3 and SW4 for switching transmission paths thereof on the basis of a user selection through input unit 490 or a major/minor channel switch condition set in advance.

In response to the control signal CH.sig, the second, third and fourth switches SW2, SW3 and SW4 toggle to new transmission paths. In FIG. 7, paths shown inside the switches with solid lines constitute initial transmission paths, and paths shown inside the switches with dotted lines constitute transmission paths to be formed in response to a major/minor channel switch request.

In DMB receiver 400 of FIG. 7, transmission path switching is performed at an input terminal of an I-frame detector 441 and output terminals of major channel buffer 430 and minor channel buffer 445.

The second switch SW2 makes an initial connection between the input terminal of I-frame detector 441 and the input terminal of minor channel buffer 445. When channel setting unit 480 outputs a control signal in response to a major/minor channel switch request, the second switch SW2 removes the connection between the input terminal of I-frame detector 441 and the input terminal of minor channel buffer 445 then makes a connection between the input terminal of I-frame detector 441 and the input terminal of major channel buffer 430. That is, broadcast data fed to major channel buffer 430 before the occurrence of the major/minor channel switch request is now directed to I-frame detector 441 for I-frame detection.

At the same time, the third switch SW3 and fourth switch SW4 remove initial connections for audio and video outputs respectively from major channel buffer 430, and make new connections for audio and video outputs respectively from minor channel buffer 445. That is, the third switch SW3 disconnects an initial transmission path from an audio buffer 431 of major channel buffer 430 to a speaker 471, and then makes a new connection to form a transmission path from an audio buffer 447 of minor channel buffer 445 to speaker 471. The fourth switch SW4 disconnects an initial transmission path from a video buffer 433 of major channel buffer 430 to A/V codec 450, and then makes a new connection to form a transmission path from a video buffer 449 of minor channel buffer 445 to A/V codec 450.

As described above, the DMB receiver of FIG. 7 buffers minor channel broadcast data in addition to buffering major channel broadcast data, and switches output of the buffered minor channel broadcast data and input to the I-frame detector in response to a major/minor channel switch request, thereby minimizing a time delay due to major/minor channel switching.

Figure 8:
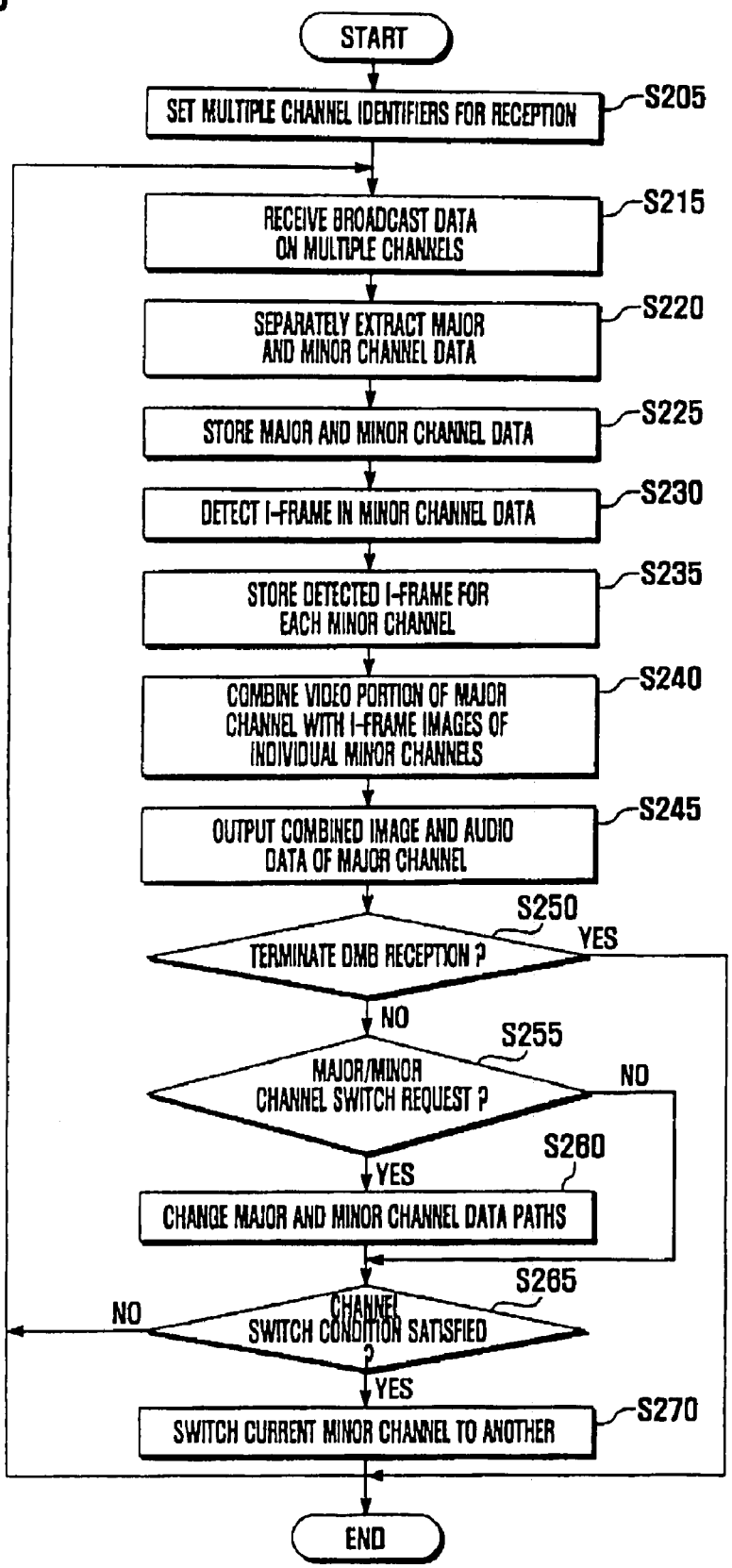
FIG. 8 is a flow chart of a method for simultaneously displaying multi-channel visual images for the receiver of FIG. 6 or FIG. 7.

FIG. 8 is a flow chart of a method for simultaneously displaying multi-channel visual images for the DMB receiver of FIG. 6 or FIG. 7. In particular, the flow chart of FIG. 8 illustrates a method to perform switching between major and minor channels during simultaneous display of multi-channel visual images. Referring to FIG. 8, the method is described as follows.

The DMB receiver sets multiple channel identifiers for DMB reception in step S205. At this step, the DMB receiver sets a major channel identifier and a quantity of minor channel identifiers. Preferably, the DMB receiver pre-stores a channel ID list having a plurality of identifiers of minor channels selected by the user or a plurality of favorite channel identifiers automatically collected from channel reception histories, and selects a channel identifier from the channel ID list in sequence according to a preset channel switch condition to set the current minor channel to a channel of the selected channel identifier. The condition to switch the channel is described in relation to FIG. 2.

The DMB receiver receives broadcast data on multiple channels associated with the channel identifiers set at step S205 and step S215, and the receiver separately extracts major channel data and minor channel data from the received broadcast data in step S220 because the major channel data and minor channel data in the broadcast data received at step S215 are in an interleaved form. This separate extraction operation is similar to the operation of TS demultiplexer 120 described in relation to FIG. 2.

After separate extraction of the major channel data and minor channel data at step S220, the DMB receiver stores the major channel data and minor channel data in a major channel buffer and minor channel buffer, respectively in step S225.

An I-frame of the current minor channel is detected from the minor channel data in step S230, and the detected I-frame is stored according to its corresponding minor channel in step S235. Steps S230 and S235 for minor channel processing are similar to the operation of the minor channel processor 140 described in relation to FIG. 2.

After I-frame detection from the minor channel data, the DMB receiver combines the video portion of the major channel with a quantity of I-frame images equal to the preset quantity of minor channels in step S240, and outputs the combined major/minor channel visual image with the audio data of the major channel in step S245.

While in DMB reception, namely, if reception of the fixed major channel is not terminated in step S250, if a major/minor channel switch request is input or a preset major/minor channel switch condition is satisfied in step S255, the DMB receiver performs switching between major and minor channel data transmission paths in step S260. That is, the DMB receiver of FIG. 6 operates the first switch SW1 as described with reference to FIG. 6, and the DMB receiver of FIG. 7 operates the second to fourth switches SW2 to SW4 as described with reference to FIG. 7.

While in DMB reception, namely, major channel reception, if the condition to switch the channel is satisfied in step S265, the DMB receiver switches the current minor channel to another minor channel in step S270, and repeats steps S215 through S265 for continued DMB reception.

The condition to switch the channel is preferably one of a change request by the user, a preset change period and detection of an I-frame on the current minor channel. The condition to switch the channel and step S270 of switching between major/minor channels are described in relation to channel setting unit 280 in FIG. 2.

Through steps described above, the DMB receiver of FIG. 6 or 7 can both simultaneously display up-to-date multi-channel visual images and perform, in response to a major/minor channel switch request, switching between the major channel and a minor channel selected at the time of the request. In particular, the DMB receiver of FIG. 7 can minimize the time delay due to major/minor channel switching.

Figure 9:
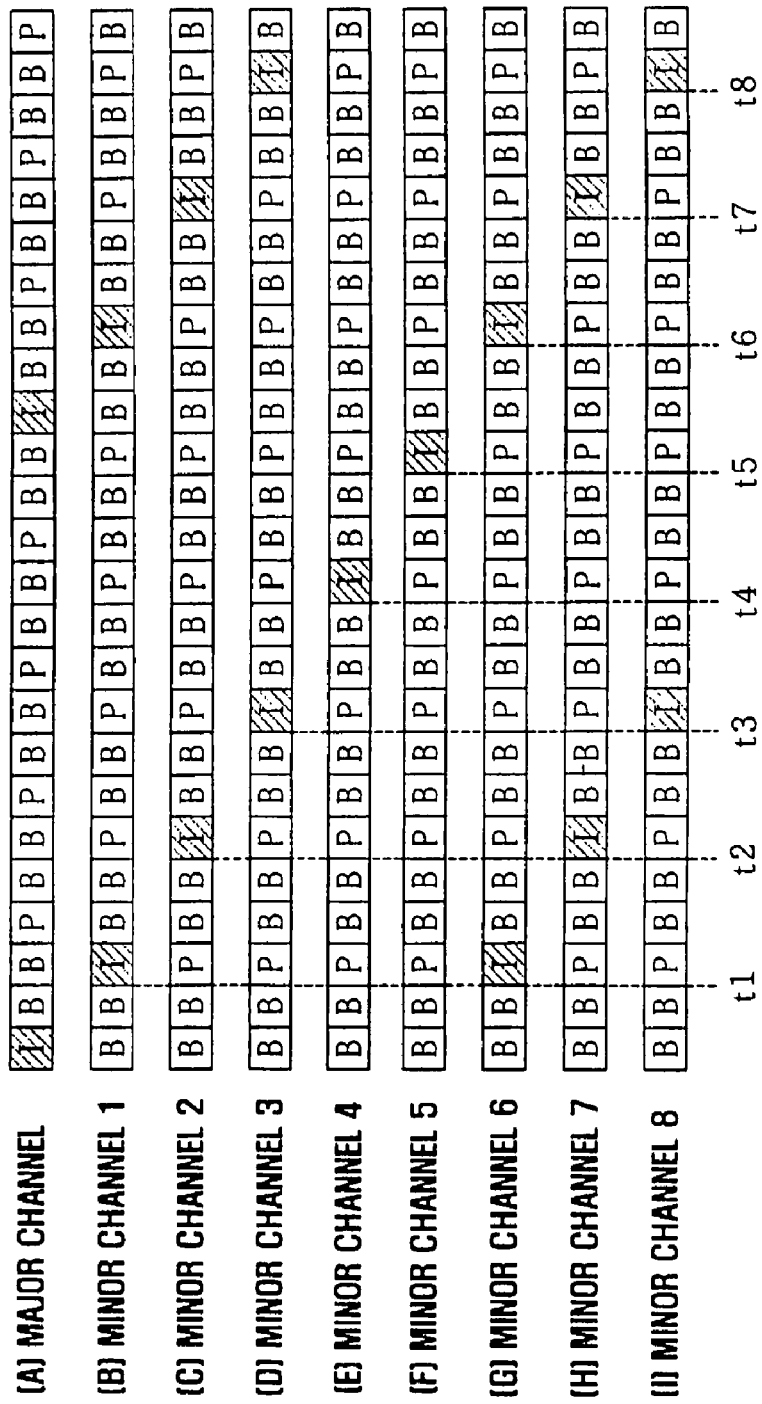
FIG. 9 illustrates structures of MPEG video data processed by the receivers of FIGS. 2, 3, 6 and 7.

FIG. 9 illustrates structures of MPEG video data processed by the receiver of FIG. 2, 3, 6 or 7. That is, FIG. 9 shows examples of video streams composing typical MPEG video broadcasts receivable by the DMB receiver: a video stream (A) of a major channel, a video stream B) of a minor channel-1, a video stream (C) of a minor channel-2, a video stream (D) of a minor channel-3, a video stream (E) of a minor channel-4, a video stream (F) of a minor channel-5, a video stream (G) of a minor channel-6, a video stream (H) of a minor channel-7, and a video stream (J) of a minor channel-8.

As described above, the DMB receiver of the present invention receives video streams on multiple channels. In the case of minor channels, one of the minor channels is selected at a time, and only I-frames, which serve as reference image frames, are detected from broadcast data on the currently selected minor channel and stored. Referring to FIG. 9, if the condition to switch a channel is detection of an I-frame on the current minor channel, the DMB receiver continuously receives a video stream such as (A) on the major channel. During continuous reception on the major channel, the current minor channel is switched from 'minor channel-1' to 'minor channel-2' after detection of an I-frame on 'minor channel-1' at time t1; from 'minor channel-2' to 'minor channel-3' after detection of an I-frame on 'minor channel-2' at time t2; from 'minor channel-3' to 'minor channel-4' after detection of an I-frame on 'minor channel-3' at time t3; from 'minor channel-4' to 'minor channel-5' after detection of an I-frame on 'minor channel-4' at time t4; from 'minor channel-5' to 'minor channel-6' after detection of an I-frame on 'minor channel-5' at time t5; from 'minor channel-6' to 'minor channel-7' after detection of an I-frame on 'minor channel-6' at time t6; from 'minor channel-7' to 'minor channel-8' after detection of an I-frame on 'minor channel-7' at time t7; and from 'minor channel-8' back to 'minor channel-1' after detection of an I-frame on 'minor channel-8' at time t8. Then, this process is repeated. Although an I-frame is received on 'minor channel-1' and 'minor channel-6', 'minor channel-2' and 'minor channel-7', and 'minor channel 3' and 'minor channel 8' at a same time, respectively, each minor channel is selected in order of precedence during updating an I-frame. Accordingly, the 'minor channel-1', 'minor channel-2' and 'minor channel-3' are selected in sequence and the updated I-frame on the 'minor channel-6', 'minor channel-7' and 'minor channel-8' is disregarded.

As a result, during output of major channel broadcast data, whenever broadcast data of a minor channel selected from the eight minor channels is output, an I-frame of the selected minor channel is updated, thereby enabling output of up-to-date visual images of minor channels.

FIGS. 10A and 10B illustrate display screen layouts for presenting multi-channel visual images output by the DMB receivers of FIGS. 2, 3, 6 and 7. The DMB receiver outputs broadcast data received on multiple channels in screen layouts illustrated in FIGS. 10A and 10B. As described with reference to FIGS. 2 to 8, broadcast data of minor channels is updated with associated I-frame images, thereby enabling delivery of up-to-date visual images of the minor channels. Switching between the major channel and a selected minor channel can be performed according to a user request. For example, if the user selects a display area associated with a minor channel, switching between the major channel and minor channel is performed. If the user selects a display area associated with the major channel, the selected display area is preferably enlarged. Preferably, the DMB receiver pre-stores display information for enlargement (for example, enlargement ratios and display locations), and enlarges the display area associated with the major channel using the display information.

In the description, although a DMB receiver simultaneously receives one major and one minor channel or one major and two minor channels, the DMB receiver may also simultaneously receive one major channel and two or more minor channels. Although the present invention addresses a DMB receiver, it may also be applied to a receiver for any digital broadcasting, such as DMB, digital video broadcasting-handheld (DVB-H), and MediaFLO.

A broadcast data display method according to another embodiment of the present invention is described. In the method, a single screen is divided into display areas corresponding to broadcast channels available in a DMB receiver; one of the available channels is automatically set as a major channel and the remaining channels are set as minor channels, on the basis of a channel reception history or a preset channel list; and broadcast data of the major channel is displayed in an associated display area and visual images of the minor channels are displayed in associated display areas, in the form of thumbnail images.

For example, in the case where two broadcast channels are available in a DMB receiver, the display screen is divided into two display areas, and broadcast data of one major channel is displayed in one of the display areas and an up-to-date visual image of one minor channel is displayed in the other display area. In the case where four broadcast channels are available in a DMB receiver, the display screen is divided into four display areas, and broadcast data of one major channel is displayed in one of the display areas and up-to-date visual images of the remaining three minor channels are displayed in their corresponding display areas, in the form of thumbnail images.

The broadcast data of a major channel may include video data and audio data. An up-to-date visual image of a minor channel may be a still image corresponding to an I-frame detected in the broadcast data of the minor channel. In the case of channel switching, the still image may also correspond to a raw image captured from the most recently decoded broadcast data of the former major channel. Preferably, the broadcast data of a major channel and up-to-date visual images of minor channels are resized according to positions and sizes of corresponding display areas in a single screen, and displayed in the form of thumbnail images.

Figure 11:
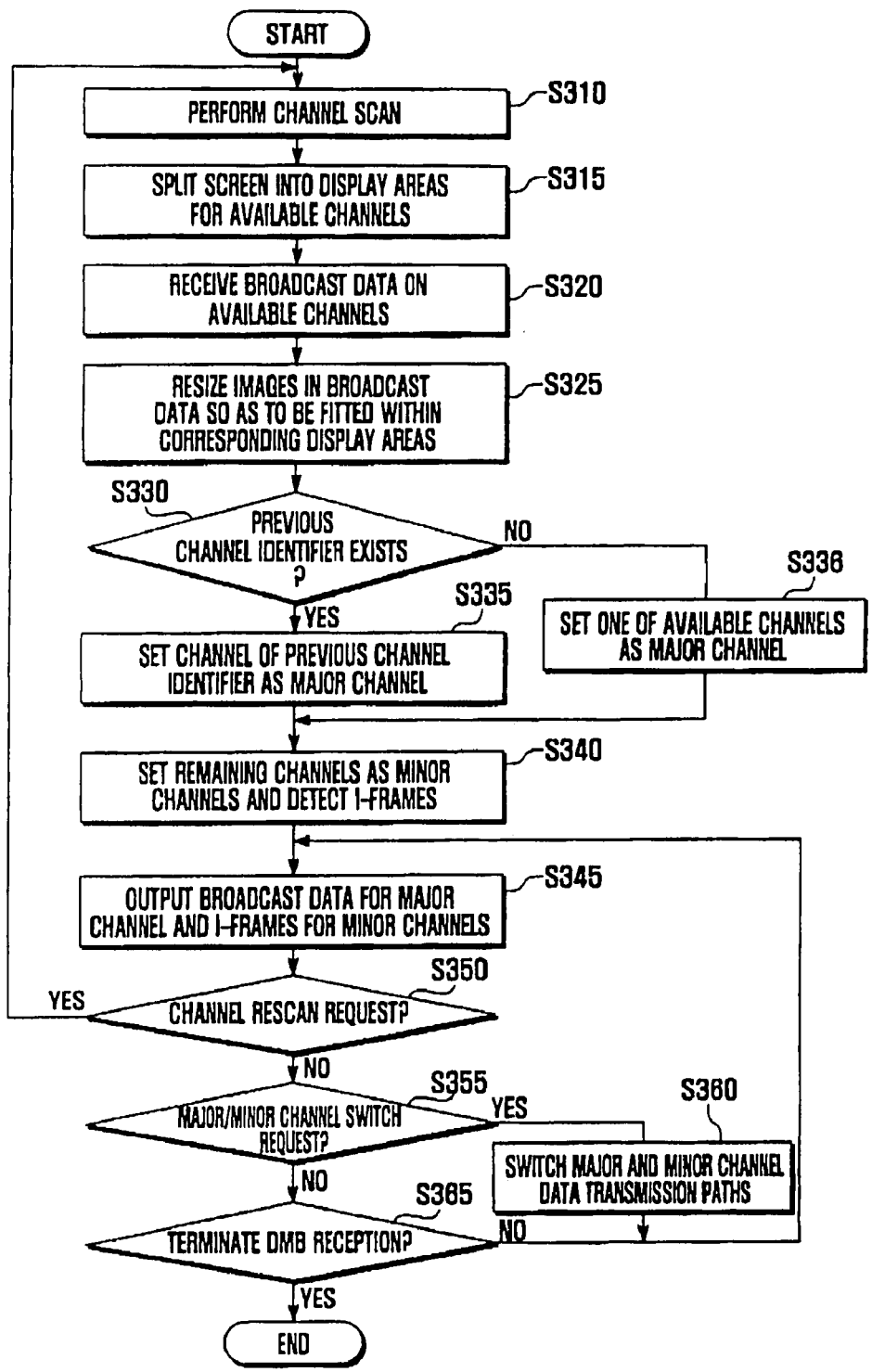
FIG. 11 is a flow chart of a method for simultaneously displaying multi-channel visual images according to another embodiment of the present invention.

Referring to FIG. 11, the method is described as follows.

When DMB reception is initiated by a user, a DMB receiver performs channel scan to identify available broadcast channels in step S310, and divides the screen into display areas corresponding to the individual available channels in step S315. The DMB receiver simultaneously receives broadcast data on the available channels in step S320, and resizes video images in the received broadcast data so that the video images can fit within their corresponding display areas in step S325.

The DMB receiver checks if a previous channel identifier exists in step S330. If a previous channel identifier exists, the DMB receiver sets a channel of the previous channel identifier as a major channel in step S335. If a previous channel identifier does not exist, the DMB receiver sets one of the available channels as a major channel in step S336. The DMB receiver sets the remaining available channels as minor channels, and detects I-frames in broadcast data of the minor channels in step S340.

The DMB receiver combines the detected I-frames with a video signal of the major channel into a screen output image, and displays the screen output image in step S345. That is, whereas video and audio signals of the major channel are reproduced as a broadcast stream, detected I-frames of the individual minor channels are displayed as up-to-date visual images.

The DMB receiver checks if the user requests to rescan broadcast channels in step S350. If the user requests to rescan, the DMB receiver repeats step S310 and subsequent steps. If the user requests to switch major/minor channels in step S355, the DMB receiver exchanges the major channel and a minor channel selected by the user with each other in step S360, and repeats step S345 and subsequent steps. That is, after step S360, video and audio signals of the new major channel are reproduced as a broadcast stream and a detected I-frame of the former major channel is displayed in the corresponding display area as an up-to-date visual image. If the user requests to terminate DMB reception in step S365, the DMB reception is terminated, otherwise the DMB receiver returns to step S345 to continue display of the screen output image.

As described above, the DMB receiver of the present invention simultaneously displays up-to-date multi-channel images on a single screen. Broadcast data of one major channel and I-frames extracted from broadcast data of multiple minor channels are simultaneously displayed in corresponding display areas in the single screen. As a result, during viewing of the major channel broadcast, the user can easily perform channel selection or switching using up-to-date visual images.

Figure 12:
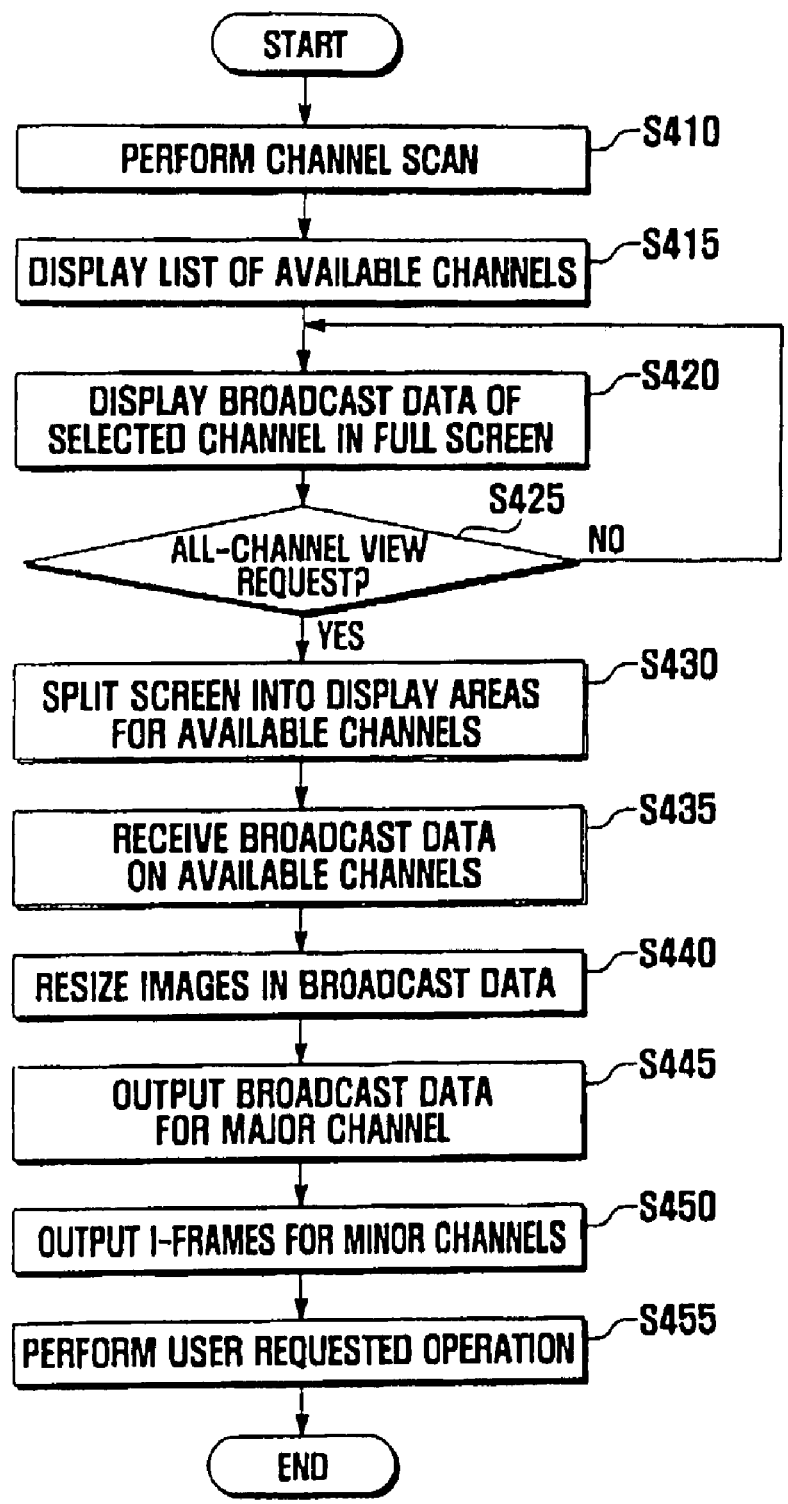
FIG. 12 is a flow chart of a method for simultaneously displaying multi-channel visual images according to another embodiment of the present invention.

Referring to FIG. 12, the method is described as follows.

When a user initiates DMB reception, a DMB receiver performs channel scan to identify available broadcast channels in step S410, and displays a list of the available channels in step S415. If a reception history having identifiers of previously received channels is present in the DMB receiver, step S410 may be skipped. When the user selects a channel in the list, the DMB receiver reproduces broadcast data of the selected channel on the full screen in step S420.

During full screen display, if the user requests an all-channel view mode in step S425, the DMB receiver divides the screen into display areas corresponding to the individual available channels in step S430. The DMB receiver simultaneously receives broadcast data on the available channels in step S435, and resizes video images in the received broadcast data so that the video images can fit within the corresponding display areas in step S440.

After image resizing, the DMB receiver reproduces a video signal of the channel selected at step S420 (major channel) as a broadcast stream in the corresponding display area in step S445, and displays in sequence detected I-frames of the remaining available channels (minor channels) as up-to-date visual images in the corresponding display areas in step S450.

During simultaneous display of multi-channel visual images, the DMB receiver can perform an operation requested by the user in step S455. User requested operations are described in connection with FIGS. 13 and 14.

Figure 13:
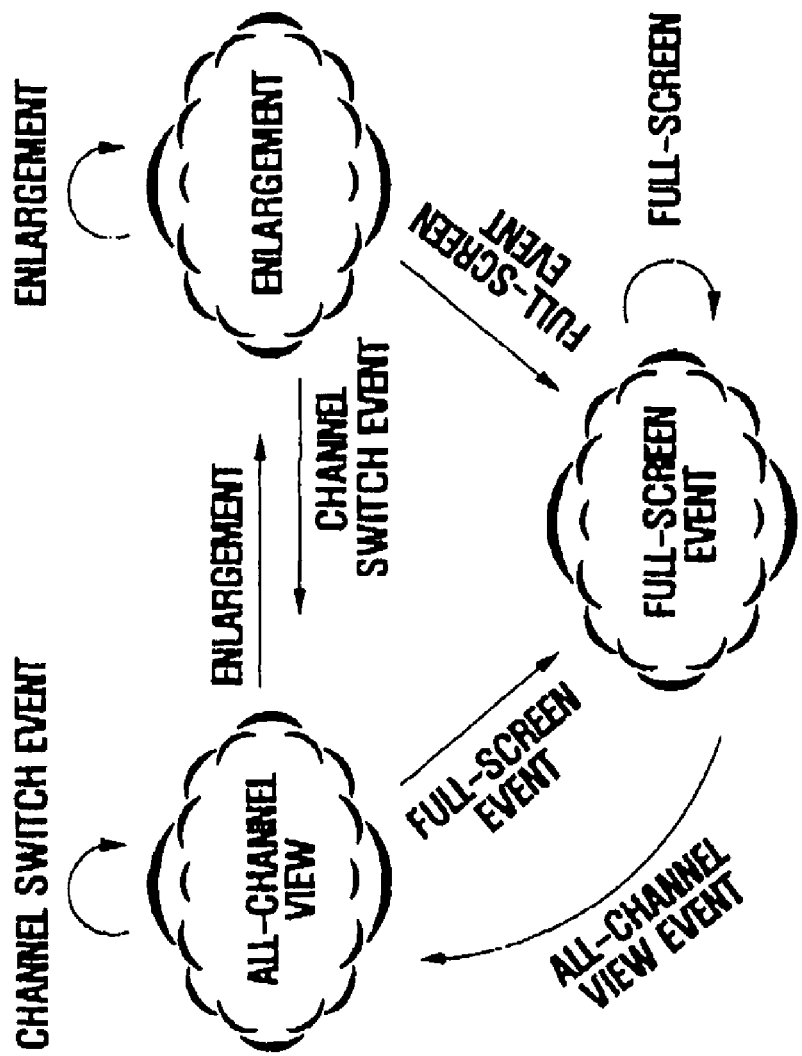
FIG. 13 is the state transition diagram illustrating transitions in screen display mode in response to user events in the method of FIG. 12.

Referring to FIG. 13, in an all-channel view mode, the DMB receiver displays major channel broadcast data and up-to-date minor channel visual images on the single screen. If the user selects a display area associated with the major channel, the DMB receiver transitions to an enlargement mode, enlarges the selected display area at a preset ratio, and displays video images in the major channel broadcast data that are preferably resized according to display area enlargement. If the user inputs a request of full-screen display, the DMB receiver makes a transition to a full-screen mode, and reproduces major channel broadcast data in the full screen. If the user inputs a request of major/minor channel switching, the DMB receiver switches major and minor channel data transmission paths, as later described with reference to FIG. 14.

In the enlargement mode, if the user selects a display area associated with the major channel, the DMB receiver enlarges the selected display area at a preset ratio within the screen size limit, and displays video images in the major channel broadcast data that are preferably resized accordingly. If the user inputs a request of full-screen display or if an enlargement event causes an associated display area to exceed the screen size limit, the DMB receiver makes a transition to the full-screen mode.

In the full-screen mode, the DMB receiver reproduces major channel broadcast data in the full screen. If the user inputs a request of all-channel view, the DMB receiver makes a transition to the all-channel view mode by performing operations described in connection with FIG. 12. If the user inputs a request of major/minor channel switching, the DMB receiver performs switching between the major and minor channels.

Sequences of screen layouts in response to user events are described later with reference to FIGS. 15 to 18.

Figure 14:
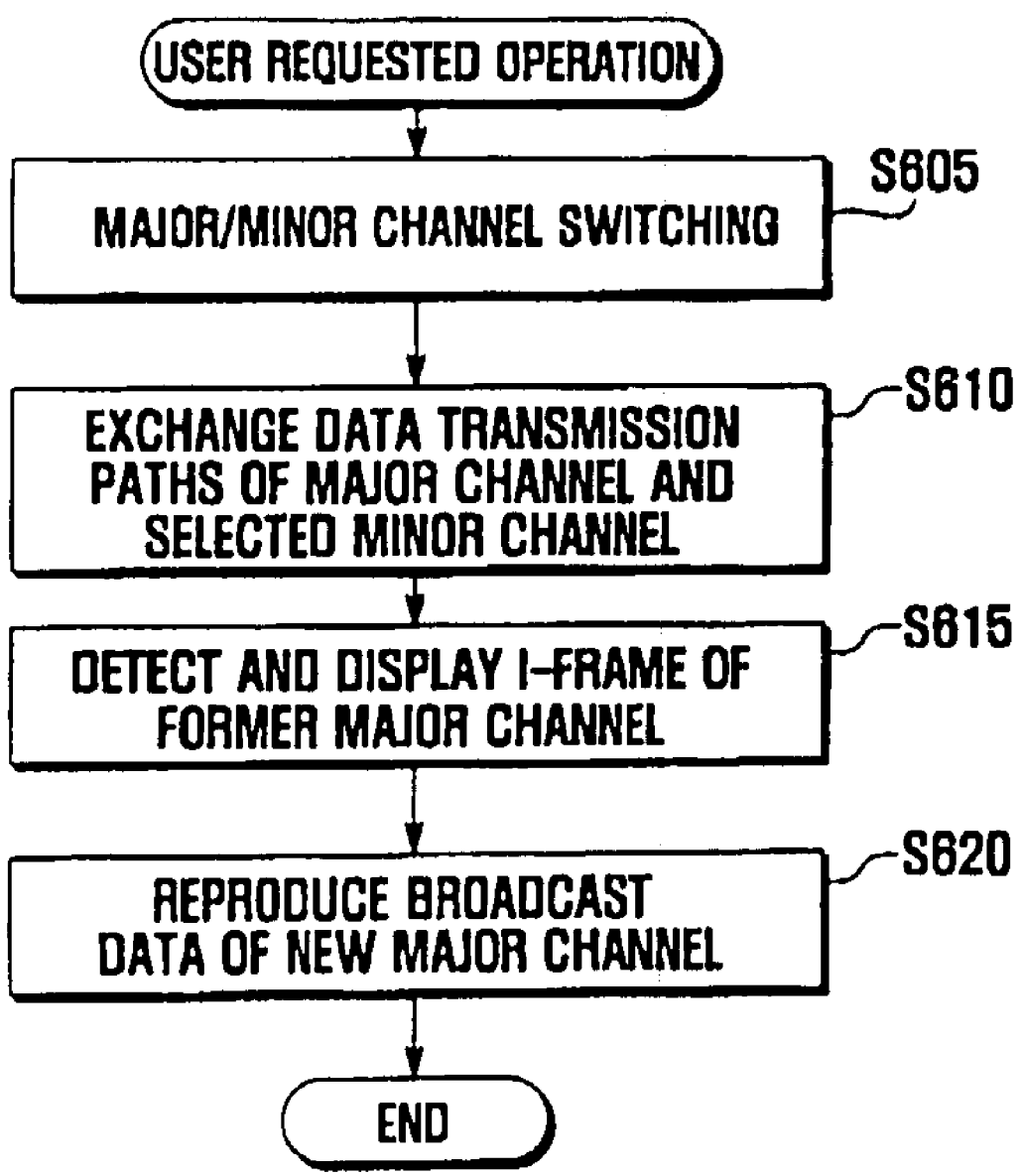
FIG. 14 is the flow chart of a channel switching procedure in the method of FIG. 12.

Referring to FIG. 14, during an all-channel view mode in which major channel broadcast data and up-to-date minor channel visual images are displayed on the single screen, when the user requests to switch major/minor channels in step S605, the DMB receiver exchanges data transmission paths associated with the major channel and a selected minor channel with each other in step S610, detects an I-frame of the former major channel and displays the detected I-frame in the corresponding display area as an up-to-date visual image in step S615, and reproduces video and audio signals of the new major channel as a broadcast stream in step S620. During major/minor channel switching, visual images of the former major channel and new major channel may be resized according to their corresponding display areas.

Figure 15:
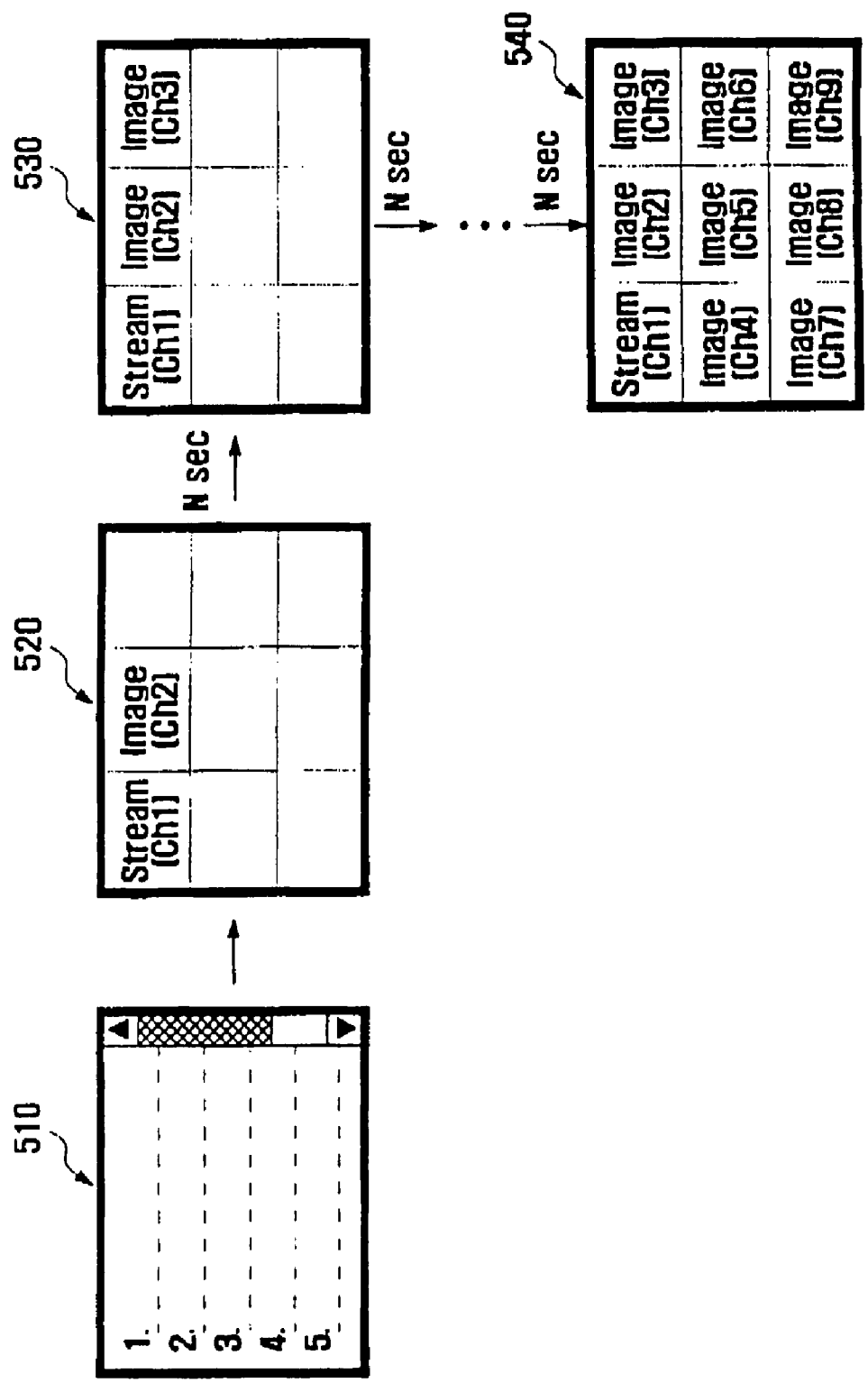
FIG. 15 illustrates the sequence of screen layouts for multi-channel visual images in response to user events.

Referring to FIG. 15, when the user initiates a DMB receiver, the DMB receiver receives information on available broadcast channels from broadcasting center 10 in FIG. 1, constructs a channel list using the channel information, and displays the constructed channel list as illustrated by an initial screen 510. To construct a channel list, the DMB receiver may scan channel information for terrestrial DMB, use electronic program guide (EPG) information for satellite DMB, or use a channel reception history for favorite channels.

Thereafter, for display of multi-channel visual images, the DMB receiver divides the display screen into display areas corresponding to available broadcast channels as illustrated by screen layouts 520, 530 and 540. Preferably, the number of display areas is equal to that of available broadcast channels. One of the display areas is associated with a broadcast channel selected as a major channel, and is used to display streaming broadcast data of the major channel. The remaining display areas are associated with broadcast channels other than the major channel (minor channels), and are used to display I-frames detected in broadcast data of the corresponding broadcast channels as up-to-date visual images.

Although, for the minor channels, I-frames are displayed as up-to-date visual images, streaming broadcast data may also be displayed. For minor channel streaming broadcast data, audio signals of the minor channel broadcast data are preferably removed to avoid possible collision with the major channel audio signal.

After division of the screen, streaming broadcast data, including video and audio signals, of the major channel selected with the initial screen 510 is displayed in the associated display area, and I-frames detected in broadcast data of the minor channels are displayed as up-to-date visual images in the display areas associated with the individual minor channels.

I-frames of the individual minor channels may be displayed at one time through buffering of the I-frames, or be sequentially displayed in order of channel identifiers of the channel list (or in order of thumbnail scanning) as illustrated in FIG. 15.

For example, as shown in screen layout 520, streaming broadcast data of the major channel (Ch1) is displayed in the display area associated with the major channel, and an I-frame of a minor channel (Ch2) is displayed as an up-to-date visual image in the display area associated with the minor channel. After a preset time duration (N seconds), for example three frame periods, an I-frame of another minor channel (Ch3) is displayed as an up-to-date visual image in the associated display area, as shown in screen layout 530. After a preset time duration according to the number of minor channels to be displayed, I-frames of all minor channels are displayed as up-to-date visual images in the corresponding display areas, as shown in the screen layout 540.

As described above, the DMB receiver combines a quantity of I-frames equal to the quantity of minor channels with video data of the major channel, and outputs the combined video data and audio data of the major channel.

Figure 16:
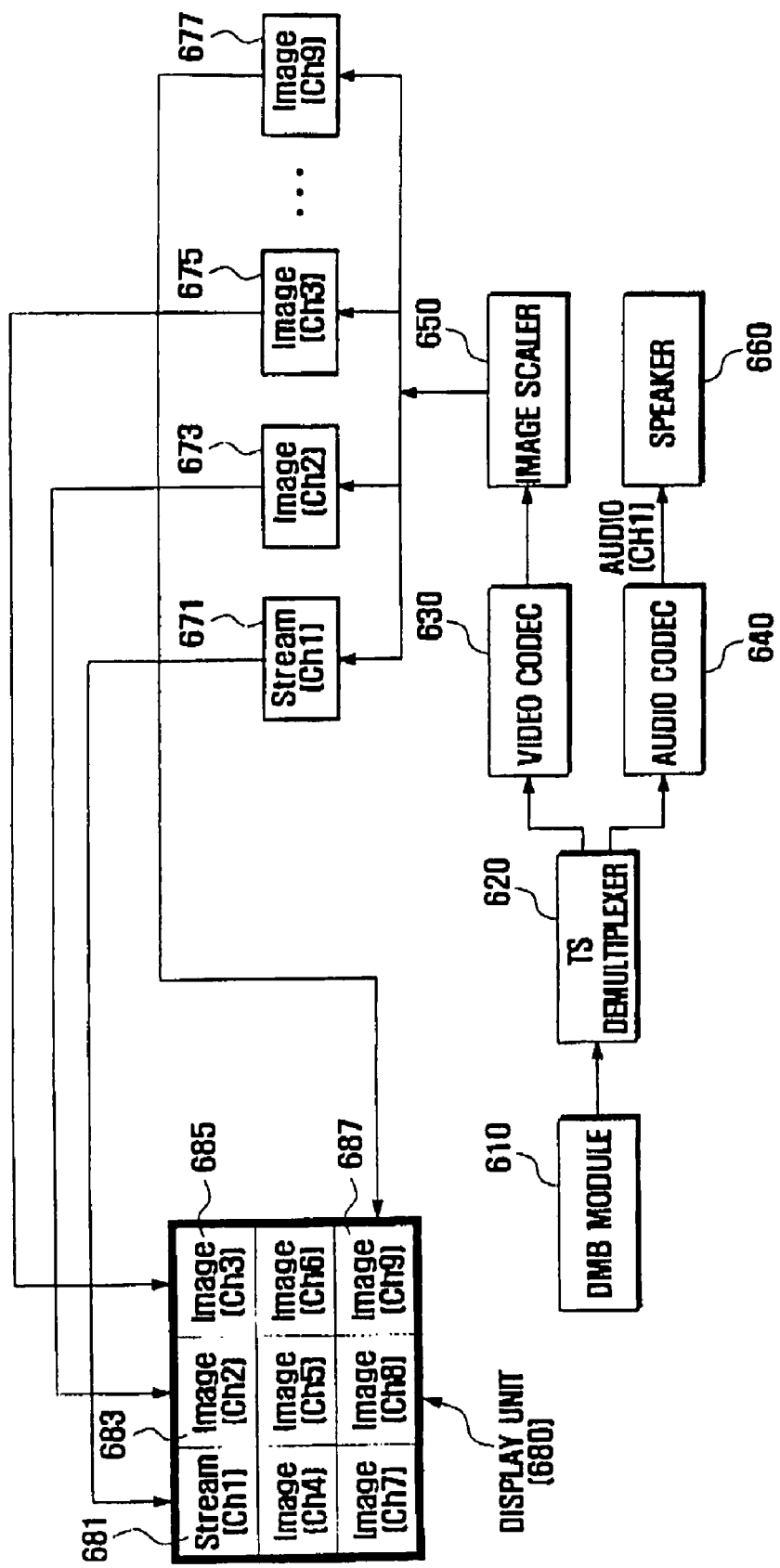
FIG. 16 is a configuration of a DMB receiver for illustrating multi-channel visual image processing.

Referring to FIG. 16, the DMB receiver includes a DMB module 610, TS demultiplexer 620, video codec 630, audio codec 640, image scaler 650, speaker 660, and display unit 680.

Elements in the DMB receiver of FIG. 16 are similar in function to corresponding elements in the DMB receiver of FIG. 2. That is, DMB module 610, TS demultiplexer 620, video and audio CODECs 630 and 640, and speaker 660 and display unit 680 are similar in function to DMB module 110, TS demultiplexer 120, the A/V codec 150, and DMB output unit 170 in FIG. 2.

The DMB receiver of FIG. 16 includes image scaler 650 to perform video image resizing on broadcast data, and is a receiver simplified specifically for the purpose of illustrating multi-channel visual image processing, and therefore may include additional elements similar to those illustrated in FIG. 2.

Upon initiation of DMB reception, DMB module 610 receives a multi-channel broadcast signal corresponding to broadcast channels selected by the user, and outputs TS data of the selected broadcast channels. TS demultiplexer 620 demultiplexes the TS data from DMB module 610 into broadcast data for each broadcast channel, and separates the channel broadcast data into video and audio data.

Video codec 630 decodes the video data from TS demultiplexer 620 into a channel video signal. Audio codec 640 decodes the audio data from TS demultiplexer 620 into a channel audio signal.

Image scaler 650 resizes video images of channel video signals according to sizes and positions of corresponding display areas. To divide the display screen of display unit 680 into display areas corresponding to available broadcast channels, a screen divider (not shown) may be provided in image scaler 650 or as a separate element.

After resizing, a video signal 671 of a channel (Ch1) selected as the major channel is output in a streaming form to an associated display area 681 for display, and an audio signal thereof is output in a streaming form to speaker 660 for reproduction. Detected I-frames (still images 673 to 677) of the remaining channels Ch2 to Ch9 (minor channels) are displayed as up-to-date visual images in their corresponding display areas 683 to 687.

The DMB receiver of FIG. 16 divides the display screen into display areas corresponding to broadcast channels, resizes the most recently decoded raw images of the individual broadcast channels, and displays the resized images as thumbnail images in their corresponding display areas. Hence, after channel scanning, thumbnail images can be displayed on the screen to represent corresponding broadcast channels, for example, in the form of a channel list, thereby enabling easy and rapid channel selection and switching for viewing.

Figure 17:
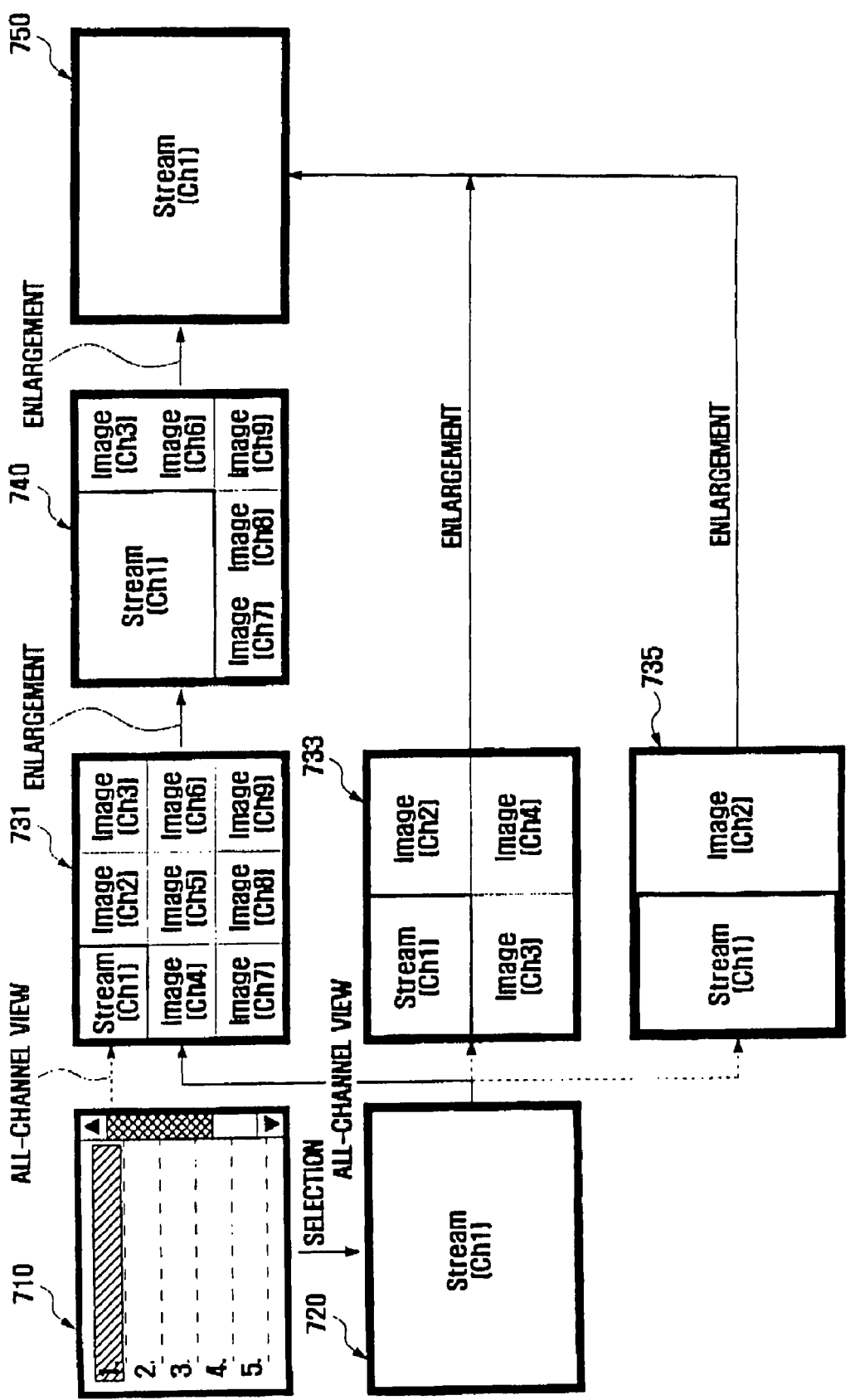
FIG. 17 illustrates the sequence of screen layouts for multi-channel visual images in response to user events.

Referring to FIG. 17, the screen layouts are related to manipulation of a display area associated with a major channel. When the user initiates a DMB receiver, the DMB receiver displays a channel list as illustrated by a screen layout 710. The channel list may be constructed through channel scanning for terrestrial DMB, using electronic program guide (EPG) information for satellite DMB, or using a channel reception history for favorite channels.

If the user selects the identifier of a channel (Ch1) as the major channel during display of the channel list, the DMB receiver outputs streaming broadcast data of the selected channel by displaying a video signal of the selected channel in a full screen mode as illustrated by a screen layout 720, and by reproducing an audio signal thereof through a speaker.

If the user requests all-channel view during the full screen mode, the DMB receiver makes a transition to an all-channel view mode, and displays multi-channel visual images of available channels in their corresponding display areas of the screen, as shown in screen layout 731, 733 or 735 depending upon the quantity of available channels. The DMB receiver may also make a direct transition to the all-channel view mode in response to a request of all-channel view during display of the channel list.

During the all-channel view mode, the major channel selected for viewing is preferably distinguished from minor channels as illustrated by screen layout 731. That is, streaming broadcast data of the major channel Ch1 is displayed in the associated display area. Still images, such as I-frames detected in broadcast data of individual minor channels Ch2 to Ch9, are displayed as up-to-date visual images in their corresponding display areas.

If the user selects the display area associated with the major channel during the all-channel view mode, the DMB receiver makes a transition to an enlargement mode, enlarges the associated display area at a preset ratio as illustrated by a screen layout 740, and preferably resizes video images to be displayed according to enlargement of the associated display area.

If the user again selects the enlarged display area associated with the major channel Ch1 during the enlargement mode, the DMB receiver transitions to the full screen mode, and enlarges the associated display area to the full screen as shown in screen layout 750, and preferably resizes video images to be displayed in broadcast data of the major channel Ch1 according to enlargement of the associated display area.

Although not shown in FIG. 17, the DMB receiver may make backward transitions from the current display mode to the previous display modes through, for example, a prior-mode function.

Figure 18:
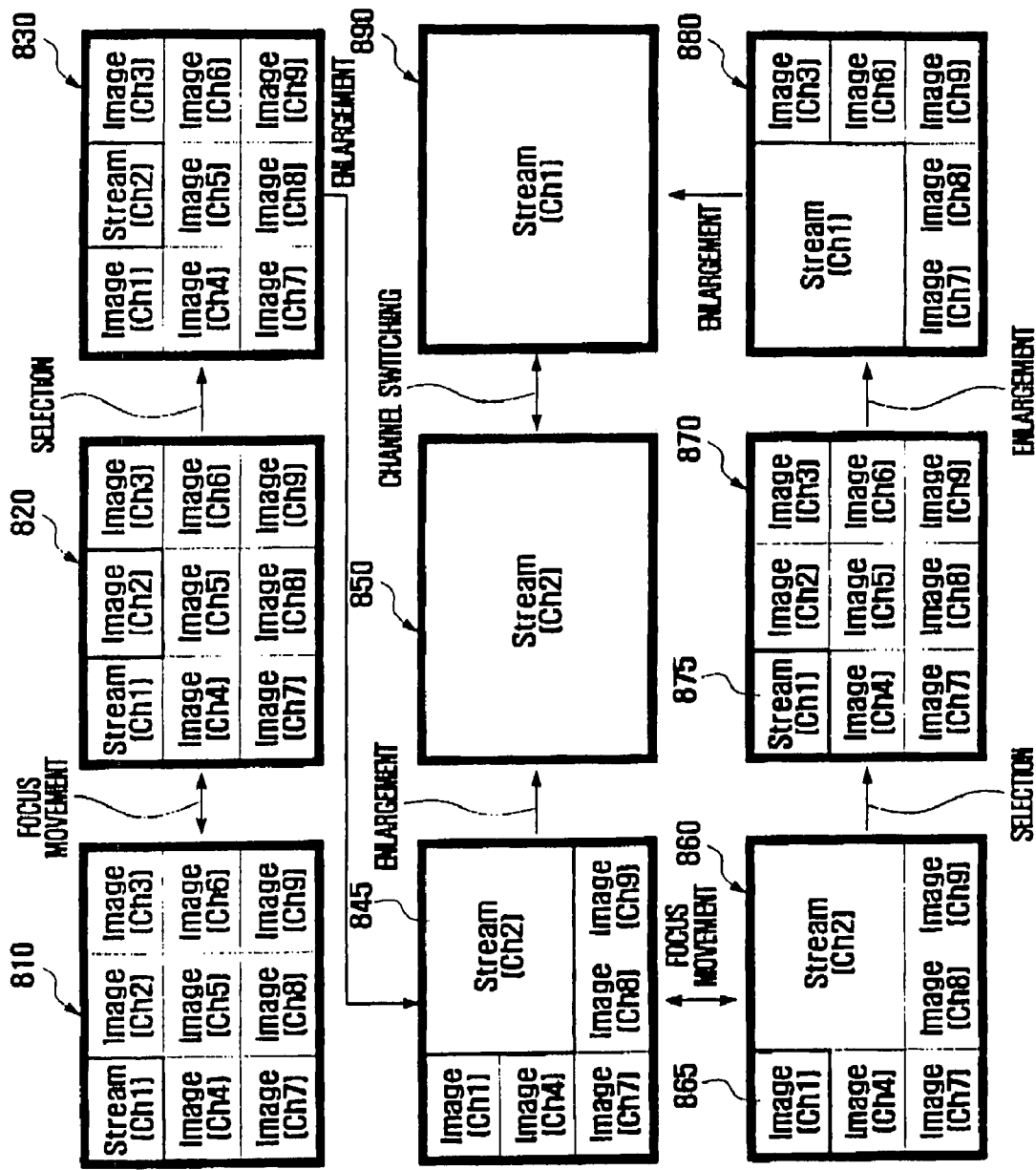
FIG. 18 illustrates the sequence of screen layouts for multi-channel visual images in response to user events.

Referring to FIG. 18, the screen layouts relate to channel switching. Initially, as shown in screen layout 810, one major channel Ch1 is associated with a display area 811 and the DMB receiver is in an all-channel view mode.

During the all-channel view mode, in which multi-channel visual images of available broadcast channels are displayed, if the user moves the focus from display area 811 to a display area 812 for major/minor channel switching, the DMB receiver places the focus on display area 812 as illustrated by a screen layout 820. If the user selects the focused display area 812 through a key input or the like, the DMB receiver performs major/minor channel switching as illustrated by a screen layout 830.

That is, before the major/minor channel switching (screen layout 820), a streaming video signal of the major channel Ch1 is displayed in display area 811, and an I-frame of a minor channel Ch2 is displayed in display area 812. After the major/minor channel switching (screen layout 830), a streaming video signal of the new major channel Ch2 is displayed in display area 812, and a still image, such as an I-frame, of the former major channel Ch1 is displayed as an up-to-date visual image in display area 811. The still image may be an I-frame detected in the most recently decoded broadcast data of the former major channel Ch1, or be a raw image captured therefrom. The I-frame or raw image may be resized before being displayed according to the size and position of the corresponding display area.

During the all-channel view mode (screen layout 830), if the user selects the focused display area 812 associated with the current major channel Ch2, the DMB receiver makes a transition to an enlargement mode, enlarges display area 812 at a preset ratio as illustrated by a screen layout 840, and preferably resizes video images to be displayed in broadcast data of the major channel Ch2 according to enlargement of display area 812.

During the enlargement mode (screen layout 840), if the user selects the enlarged display area 812 associated with the current major channel Ch2, the DMB receiver makes a transition to a full-screen mode, enlarges display area 812 to the full screen as illustrated by a screen layout 850, and preferably resizes video images to be displayed in broadcast data of the major channel Ch2 according to enlargement of display area 812.

During the full-screen mode (screen layout 850), if the user requests channel switching between the current major channel Ch2 and a minor channel Ch1, the DMB receiver displays streaming broadcast data of the new major channel Ch1 on the full screen as illustrated by a screen layout 890.

During the enlargement mode (screen layout 840), if the user moves the focus from display area 812 associated with the current major channel Ch2 to display area 811 associated with a minor channel Ch1, the DMB receiver places the focus on display area 811 as illustrated by a screen layout 860. If the user selects focused display area 811 associated with the minor channel Ch1, the DMB receiver makes a transition to the initial all-channel view mode, and performs major/minor channel switching as illustrated by a screen layout 870.

That is, before the major/minor channel switching (screen layout 860), a streaming video signal of the major channel Ch2 is displayed in display area 812, and an I-frame of the minor channel Ch1 is displayed in display area 811. After the major/minor channel switching (screen layout 870), a streaming video signal of the new major channel Ch1 is displayed in display area 811, and a still image, such as an I-frame, of a new minor channel Ch2 is displayed as an up-to-date visual image in the reduced display area 812. The still image may be an I-frame detected in the most recently decoded broadcast data of the former major channel Ch2, or be a raw image captured therefrom. The I-frame or raw image may be resized before being displayed according to the size and position of the corresponding display area.

During the all-channel view mode (screen layout 870), if the user selects the focused display area 811 associated with the current major channel Ch1, the DMB receiver makes a transition to the enlargement mode, enlarges display area 811 at a preset ratio as illustrated by a screen layout 880, and preferably resizes video images to be displayed in broadcast data of the major channel Ch1 according to enlargement of display area 811.

During the enlargement mode (screen layout 880), if the user selects the enlarged display area 811 associated with the current major channel Ch1, the DMB receiver makes a transition to the full-screen mode, enlarges the display area 811 to the full screen as illustrated by the screen layout 890, and preferably resizes video images to be displayed in broadcast data of the major channel Ch1 according to enlargement of display area 811.

As apparent from the above description, the present invention provides a digital broadcast receiver and broadcast data display method enabling simultaneous display of multi-channel visual images. A video broadcast of a major channel and visual images of minor channels are simultaneously displayed and visual images of the minor channels are periodically updated on an I-frame period basis, thereby enabling simultaneous output of up-to-date multi-channel visual images. Hence, the user can easily select a desired channel. In addition, real-time video images of the major channel and up-to-date informational images of the minor channels are displayed together in their corresponding display areas of a single screen, and hence channel switching can be readily performed by selecting both the display area associated with the major channel and the display area associated with a target minor channel. Further, individual video broadcasts of available broadcast channels can be represented by thumbnail images; thereby enabling easy and rapid channel selection and channel switching.

While preferred embodiments of the present invention have been shown and described in this specification, it will be understood by those skilled in the art that various changes or modifications of the embodiments are possible without departing from the spirit and scope of the invention as further defined by the appended claims.

What is claimed is:

1. A digital broadcast receiver comprising:
    a broadcast receiving unit for simultaneously receiving digital broadcast data on a plurality of channels;
    a broadcast output unit for simultaneously outputting real-time broadcast data of a particular one of the channels and still images of the remaining channels on a single screen; and
    a still image updater for periodically updating the still images of the remaining channels, while continuing the outputting of the real-time broadcast data of the particular one of the channels,
    wherein the still image updater comprises an I-frame detector for repeatedly detecting an I-frame in broadcast data of a current minor channel on an I-frame period basis and an I-frame storage for storing detected I-frames of minor channels and updating a stored I-frame of the current minor channel with a newly detected I-frame,
    wherein the I-frame detector compares sizes of received image frames and detects a relatively large image frame as an I-frame, and
    wherein the broadcast output unit comprises a major channel buffer for storing real-time broadcast data of a major channel and an image synthesizer for generating a screen output image using the real-time broadcast data stored in the major channel buffer and I-frames stored in the I-frame storage.

2. The digital broadcast receiver of claim 1, wherein the broadcast receiving unit simultaneously receives digital broadcast data on one major channel and at least one minor channel.

3. The digital broadcast receiver of claim 2, further comprising a channel setting unit for setting channels to be received by the broadcast receiving unit.

4. The digital broadcast receiver of claim 3, wherein the channel setting unit resets the current minor channel on the basis of a channel switch condition set in advance.

5. The digital broadcast receiver of claim 4, wherein the channel setting unit stores a channel list having a plurality of channel identifiers, selects in sequence one of the channel identifiers in the channel list on the basis of the condition to switch the channel, and resets the current minor channel to a channel of the selected channel identifier.

6. The digital broadcast receiver of claim 5, wherein the channel identifiers on the channel list have to be greater than or equal to the preset quantity of minor channels to be simultaneously output to the single screen.

7. The digital broadcast receiver of claim 6, wherein the channel list has channel identifiers selected by a user.

8. The digital broadcast receiver of claim 6, wherein the channel list has identifiers of favorite channels automatically collected from a channel reception history.

9. The digital broadcast receiver of claim 6, wherein the channel list has identifiers of available channels scanned by the digital broadcast receiver.

10. The digital broadcast receiver of claim 6, wherein the channel list has channel identifiers generated using information from an electronic program guide.

11. The digital broadcast receiver of claim 4, wherein the condition to switch the channel is one of a channel change request input by a user, a preset channel change period, and detection of an I-frame on the current minor channel.

12. The digital broadcast receiver of claim 3, wherein in response to a channel change request from a user the channel setting unit sets the channels to be received using channel identifiers accompanied by the channel change request.

13. The digital broadcast receiver of claim 5, wherein the I-frame detector pre-stores I-frame periods of the minor channels, and detects an image frame received on the current minor channel at each I-frame period thereof as an I-frame.

14. The digital broadcast receiver of claim 5, wherein the I-frame storage stores and updates I-frames corresponding to the current minor channel.

15. The digital broadcast receiver of claim 14, wherein the image synthesizer sequentially selects from the I-frame storage a quantity of I-frames equal to the preset quantity of minor channels to be simultaneously output to the single screen, and combines the selected I-frames with a video signal of the major channel to generate a screen output image.

16. A broadcast data display method for a digital broadcast receiver, comprising:
  receiving digital broadcast data on a plurality of channels;
  outputting simultaneously real-time broadcast data of a selected one of the channels and still images of the remaining channels on a single screen; and
  periodically updating the still images of the remaining channels while continuing the outputting of the real-time broadcast data of the selected one of the channels,
  wherein updating the still images comprises repeatedly detecting an I-frame in broadcast data of a current minor channel on an I-frame period basis, storing detected I-frames of minor channels, and updating a stored I-frame of the current minor channel with a newly detected I-frame,
  wherein detecting the I-frame comprises comparing sizes of received image frames and detecting a relatively large image frame as an I-frame,
  wherein the simultaneously outputting step comprises outputting real-time broadcast data of individual minor channels in sequence together with the real-time broadcast data to the single screen, and wherein the sequence includes one I-frame from each of preset minor channels.

17. The broadcast data display method of claim 16, wherein the receiving step comprises simultaneously receiving digital broadcast data on one major channel and at least one minor channel.

18. The broadcast data display method of claim 16, further comprising setting, using a channel list having a plurality of channel identifiers, one channel as a major channel and at least one channel as a minor channel.

19. The broadcast data display method of claim 18, wherein the channel identifiers on the channel list have to be greater than or equal to the preset quantity of major and minor channels to be simultaneously output to the single screen.

20. The broadcast data display method of claim 18, wherein the channel list has identifiers of channels selected by a user.

21. The broadcast data display method of claim 18, wherein the channel list has identifiers of favorite channels automatically collected from a channel reception history.

22. The broadcast data display method of claim 18, wherein the channel list has identifiers of channels scanned by the digital broadcast receiver.

23. The broadcast data display method of claim 18, wherein the channel list has channel identifiers generated using information from an electronic program guide.

24. The broadcast data display method of claim 18, wherein the simultaneously outputting step further comprises:
  outputting real-time broadcast data of the major channel; and
  outputting I-frames detected in broadcast data of the individual minor channels in sequence together with the real-time broadcast data to the single screen, wherein the sequence includes one I-frame from each of the preset minor channels.

* * * * *